United States Patent
Kitagawa

(10) Patent No.: US 10,703,322 B2
(45) Date of Patent: Jul. 7, 2020

(54) VEHICLE SIDE AIRBAG DEVICE

(71) Applicant: TOYOTA JIDOSHA KABUSHIKI KAISHA, Toyota-shi, Aichi-ken (JP)

(72) Inventor: Yuichi Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 15/893,073

(22) Filed: Feb. 9, 2018

(65) Prior Publication Data

US 2018/0290619 A1 Oct. 11, 2018

(30) Foreign Application Priority Data

Apr. 7, 2017 (JP) ................................ 2017-077046

(51) Int. Cl.
*B60R 21/231* (2011.01)
*B60R 21/233* (2006.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............ B60R 21/23138; B60R 21/207; B60R 21/237; B60R 21/2338; B60R 21/2342;
(Continued)

(56) References Cited

U.S. PATENT DOCUMENTS 5,570,900 A * 11/1996 Brown .............. B60R 21/23138
280/729
5,636,862 A * 6/1997 Cheung ................. B60R 21/207
280/730.2

(Continued)

FOREIGN PATENT DOCUMENTS

DE 102008048398 A1 * 2/2009 ........... B60R 21/233
JP 2009-137536 A 6/2009
(Continued)

OTHER PUBLICATIONS

Getz et al. DE 10 2008 048398 English Machine translation ip.com. (Year: 2008).*

*Primary Examiner* — Karen Beck
(74) *Attorney, Agent, or Firm* — Oliff PLC

(57) ABSTRACT

A vehicle side airbag device including: a side airbag that is accommodated in a folded-up state within a side portion, which is at a vehicle transverse direction outer side at a seatback of a vehicle seat, and, at a time of a side collision, the side airbag inflating and expanding between an upper body of a vehicle occupant and a vehicle side portion, and a vehicle transverse direction inner side surface of the side airbag, which faces the vehicle occupant, sinking in toward a vehicle transverse direction outer side; and a cloth body that is disposed at a vehicle occupant side with respect to the inflated and expanded side airbag, and that spans between front and rear both end portions of the side airbag and is stretched between the front and rear both end portions, a gap being formed between the side airbag and the cloth body.

12 Claims, 27 Drawing Sheets

(51) Int. Cl.
*B60R 21/207* (2006.01)
*B60R 21/2342* (2011.01)
*B60R 21/2338* (2011.01)
*B60R 21/237* (2006.01)
*B60R 21/00* (2006.01)

(52) U.S. Cl.
CPC ...... *B60R 21/2338* (2013.01); *B60R 21/2342* (2013.01); *B60R 21/237* (2013.01); *B60R 2021/0006* (2013.01); *B60R 2021/0041* (2013.01); *B60R 2021/0044* (2013.01); *B60R 2021/23107* (2013.01); *B60R 2021/23146* (2013.01); *B60R 2021/23308* (2013.01); *B60R 2021/23388* (2013.01)

(58) Field of Classification Search
CPC ........ B60R 21/233; B60R 2021/23388; B60R 2021/23308; B60R 2021/23146; B60R 2021/0044; B60R 2021/0041; B60R 2021/23107; B60R 2021/0006
See application file for complete search history.

(56) References Cited

U.S. PATENT DOCUMENTS

| | | | | |
|---|---|---|---|---|
| 5,730,464 A * | 3/1998 | Hill | ................... | B60R 21/23138 280/730.2 |
| 6,142,517 A * | 11/2000 | Nakamura | ........ | B60R 21/23138 280/739 |
| 7,549,672 B2 * | 6/2009 | Sato | ...................... | B60R 21/207 280/729 |
| 7,735,856 B2 * | 6/2010 | Schlosser | .......... | B60R 21/23138 280/730.2 |
| 8,596,673 B2 * | 12/2013 | Ruedisueli | .............. | B60R 21/21 280/730.2 |
| 8,684,408 B2 * | 4/2014 | Thomas | ................ | B60R 21/231 280/730.2 |
| 8,727,375 B2 * | 5/2014 | Suzuki | ................... | B60R 21/233 280/730.2 |
| 9,994,181 B1 * | 6/2018 | Dubaisi | ................. | B60R 21/207 |
| 10,246,041 B2 * | 4/2019 | Kobayashi | ............ | B60R 21/207 |
| 10,493,940 B2 * | 12/2019 | Sugishima | ............ | B60R 21/207 |
| 2005/0206138 A1 * | 9/2005 | Breuninger | ........... | B60R 21/231 280/729 |
| 2006/0119082 A1 * | 6/2006 | Peng | ................. | B60R 21/23138 280/730.2 |
| 2006/0119083 A1 * | 6/2006 | Peng | ..................... | B60R 21/207 280/730.2 |
| 2006/0131847 A1 * | 6/2006 | Sato | ...................... | B60R 21/207 280/730.2 |
| 2015/0217714 A1 * | 8/2015 | Fujiwara | ........... | B60R 21/23138 280/729 |
| 2015/0367803 A1 * | 12/2015 | Fujiwara | ............... | B60R 21/207 280/728.2 |
| 2015/0367804 A1 * | 12/2015 | Fujiwara | ........... | B60R 21/23138 280/730.2 |
| 2016/0114755 A1 * | 4/2016 | Matsuzaki | ............ | B60R 21/207 280/730.2 |
| 2018/0222435 A1 * | 8/2018 | Fukawatase | .......... | B60R 21/207 |
| 2018/0297550 A1 * | 10/2018 | Kitagawa | .............. | B60R 21/237 |
| 2019/0084515 A1 * | 3/2019 | Hatakeyama | ......... | B60R 21/261 |
| 2019/0168704 A1 * | 6/2019 | Wiscombe | .......... | B60R 21/2176 |

FOREIGN PATENT DOCUMENTS

| | | | | |
|---|---|---|---|---|
| JP | 2015-77844 | * | 4/2015 | ........... B60R 21/231 |
| JP | 2017100493 A | * | 6/2017 | ........... B60R 21/231 |
| WO | 2014/033820 A1 | | 3/2014 | |

* cited by examiner

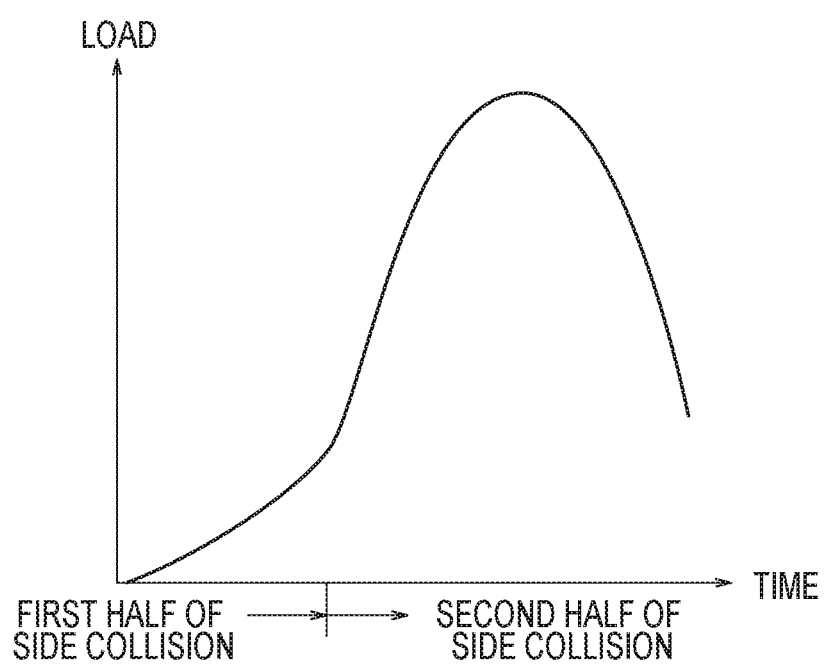

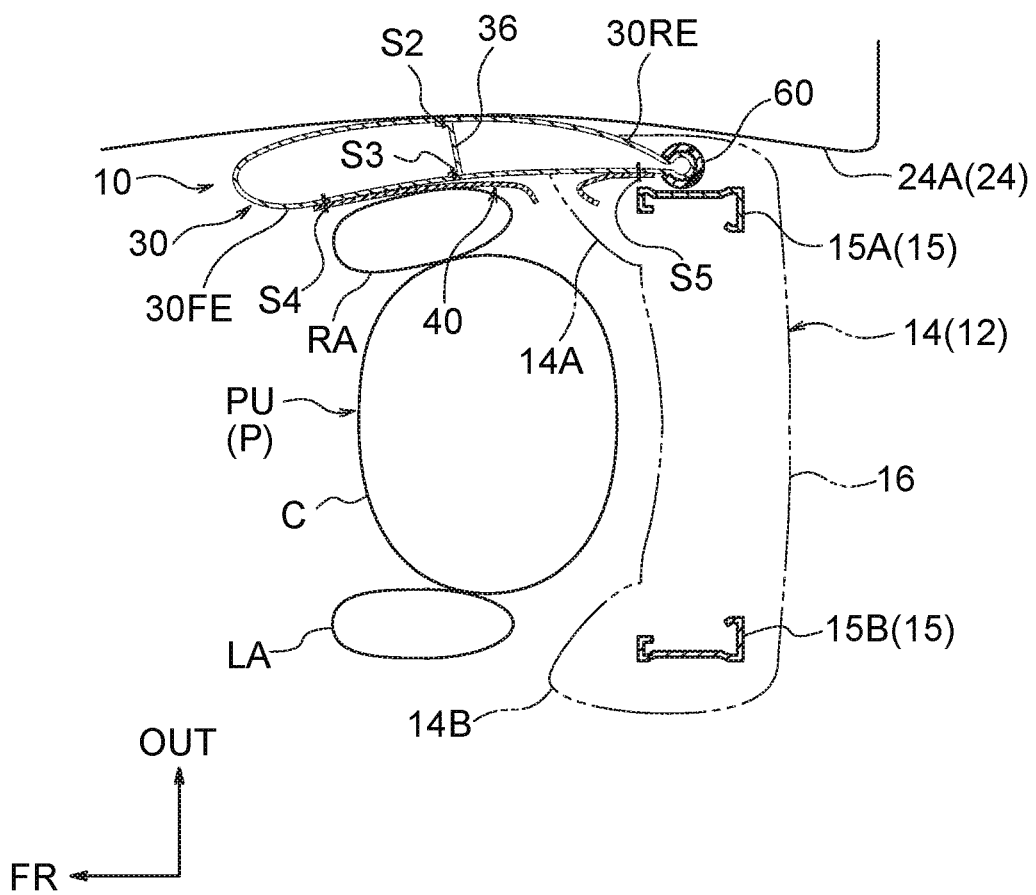

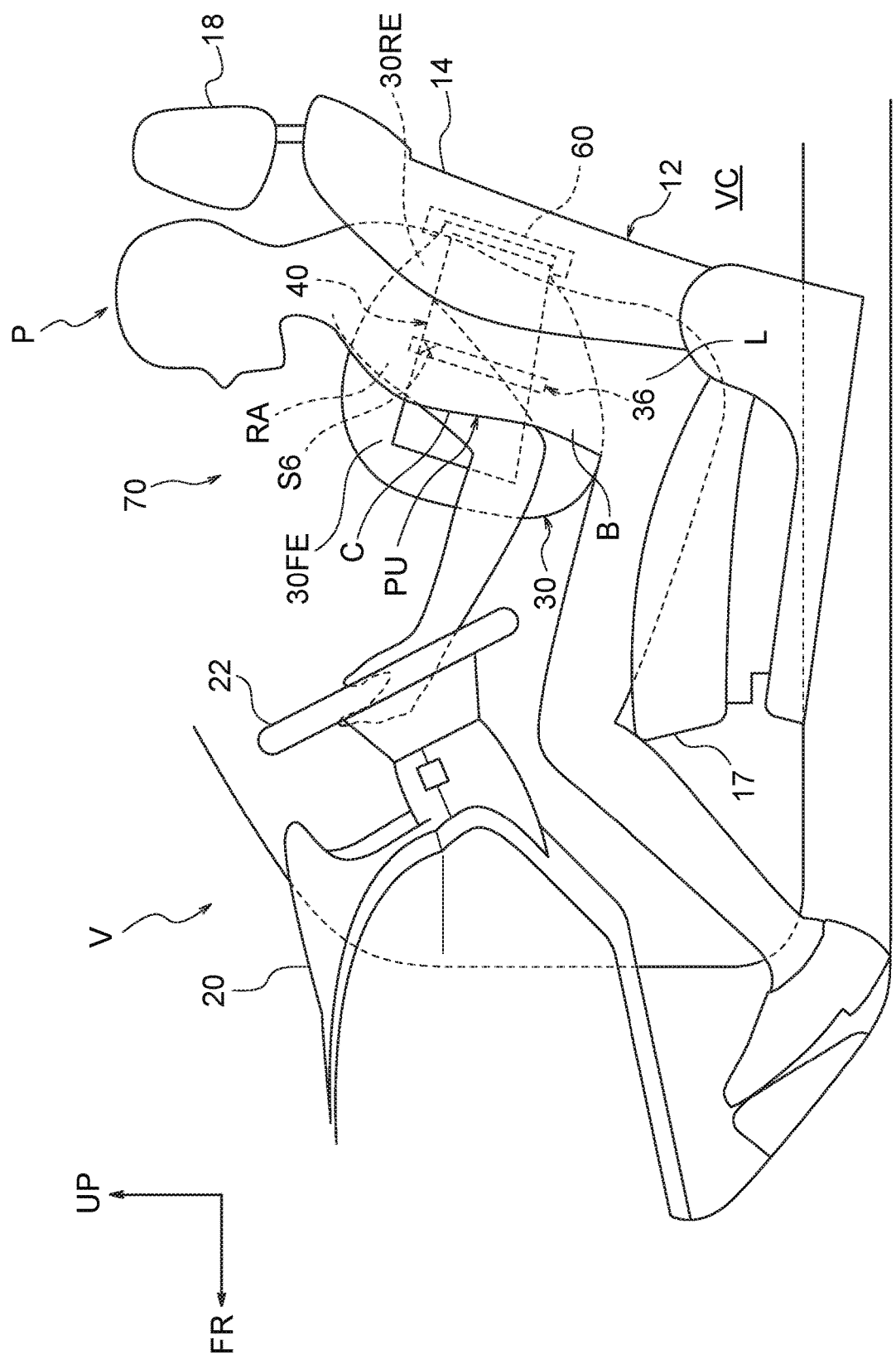

VEHICLE SIDE AIRBAG DEVICE

CROSS-REFERENCE TO RELATED APPLICATION

This application is based on and claims priority under 35 USC 119 from Japanese Patent Application No. 2017-077046 filed on Apr. 7, 2017, the disclosure of which is incorporated by reference herein.

BACKGROUND

Technical Field

The present disclosure relates to a vehicle side airbag device and a method of manufacturing thereof.

Related Art

The side airbag device disclosed in Japanese Patent Application Laid-Open (JP-A) No. 2009-137536 has a side airbag bag body that is inflated and expanded at the time of a side collision of a vehicle, and a connecting cloth that is disposed at least at the vehicle occupant side of the side airbag bag body that has inflated and expanded. The side airbag bag body has a front side inflating portion and a rear side inflating portion that expand in correspondence with the front portion and the rear portion of the chest portion of the vehicle occupant, respectively. The connecting cloth is disposed so as to correspond to the central portion of the chest portion of the vehicle occupant, and connects the front side inflating portion and the rear side inflating portion. At the time when the central portion of the chest portion of the vehicle occupant enters-in between the front side inflating portion and the rear side inflating portion, this connecting cloth generates a pushing force that pushes-back the central portion of the chest portion. The pushing force of the connecting cloth is smaller than the pushing forces by which the front side inflating portion and the rear side inflating portion push-back the front portion and the rear portion of the chest portion of the vehicle occupant. Due thereto, the ability to restrain the vehicle occupant is improved by achieving a balance in the pushing forces in the vehicle longitudinal direction at the side surface of the chest portion of the vehicle occupant.

However, in the side airbag device of the above-described structure, due to the central portion of the chest portion of the vehicle occupant being made to enter-in between the front and rear inflating portions, the low pushing force of the connecting cloth is applied to the central portion of the chest portion of the vehicle occupant. Therefore, in a case in which, due to braking or the like of the vehicle at the time of a side collision, the vehicle occupant tilts forward or the like and the positional relationships between the chest portion of the vehicle occupant and the front and rear inflating portions become offset, there is the possibility that the central portion of the chest portion of the vehicle occupant will not enter-in between the front and rear inflating portions, and that the desired vehicle occupant restraining performance will not be able to be achieved.

Further, if the upper arm portion of the vehicle occupant becomes sandwiched between the front side inflating portion and the chest portion due to the aforementioned forward tilting, there is the possibility that the side surface of the chest portion will be pushed-back too much by an amount corresponding to the upper arm portion, and that the load of the chest portion will increase.

SUMMARY

In view of the above-described circumstances, the present disclosure provides a vehicle side airbag device and a method of manufacturing thereof by which a stable vehicle occupant restraining performance is obtained even in a case in which a vehicle occupant tilts forward due to braking of the vehicle or the like at the time of a side collision.

A vehicle side airbag device relating to a first aspect of the present disclosure includes: a side airbag that is accommodated in a folded-up state within a side portion that is at a vehicle transverse direction outer side at a seatback of a vehicle seat, and, at a time of a side collision of a vehicle, the side airbag inflates and expands between an upper body of a vehicle occupant and a vehicle side portion, and a vehicle transverse direction inner side surface which faces the vehicle occupant sinking in toward a vehicle transverse direction outer side as seen in plan view; and a cloth body that is disposed at a vehicle occupant side with respect to the side airbag that has inflated and expanded, and that spans between front and rear both end portions of the side airbag and is stretched between the front and rear both end portions, and a gap is formed between the side airbag and the cloth body.

In accordance with the first aspect of the present disclosure, at the time of a side collision of the vehicle, the side airbag inflates and expands between the upper body of the vehicle occupant and a vehicle side portion, and the cloth body, which is disposed at the vehicle occupant side with respect to the side airbag, is stretched between the front and rear both end portions of the side airbag. The vehicle transverse direction inner side surface, which faces the vehicle occupant, of the side airbag that has inflated and expanded sinks in toward the vehicle transverse direction outer side (the side opposite the vehicle occupant) as seen in plan view, and a gap is formed between this vehicle transverse direction inner side surface and the cloth body. Therefore, in the first half of a side collision, the upper body of the vehicle occupant starts to be pushed-back at a low load by the cloth body that is in a stretched state. Then, in the second half of the side collision, the side airbag moves together with the side door toward the vehicle occupant side (the vehicle central side), and the upper body of the vehicle occupant is restrained (held) at a high load by the side airbag. Due to the above, the load to the upper body of the vehicle occupant increasing suddenly can be prevented or suppressed.

Further, in a case in which the vehicle occupant tilts forward due to braking of the vehicle or the like at the time of a side collision, the position of the upper body of the vehicle occupant shifts toward the vehicle front side with respect to the side airbag. However, the state of contact between the upper body of the vehicle occupant and the cloth body that is stretched between the front and rear both end portions of the side airbag does not change greatly. Moreover, in the first half of a side collision, when the upper arm portion of the vehicle occupant contacts the cloth body for example, due to the front end portion of the side airbag being made to move toward the vehicle transverse direction inner side due to the tension of the cloth body, it is difficult for the side airbag to come away from the upper body of the vehicle occupant. Due to the above, in accordance with the present disclosure, a stable vehicle occupant restraining performance is obtained even in a case in which the vehicle occupant tilts forward as described above.

In a vehicle side airbag device relating to a second aspect of the present disclosure, in the first aspect, the cloth body has a weak portion that is set so as to break due to a load applied from an upper arm portion and a torso of the vehicle occupant, and that is severed into front and rear portions by breaking.

In accordance with the second aspect of the present disclosure, in the second half of a side collision, the weak portion, which is provided at the cloth body that is stretched between the front and rear both end portions of the side airbag, is broken by the load that is applied thereto from the upper arm portion and the torso of the vehicle occupant, and the cloth body is severed into front and rear portions. Due thereto, the chest portion of the vehicle occupant being pushed strongly from the cloth body via the upper arm portion can be prevented.

In a vehicle side airbag device relating to a third aspect of the present disclosure, in the first or second aspect, a deformation restricting member, which is disposed so as to extend in a vehicle vertical direction and connects base cloths of the side airbag that face one another in a vehicle transverse direction, is provided at a vehicle longitudinal direction central portion of an interior of the side airbag that is in an inflated and expanded state, and the cloth body spans between a front end joined portion that is set at a front end portion of the base cloths of the side airbag, and a rear end joined portion that is set at a rear end portion of the base cloths, and a length of the cloth body is set to be shorter than a length from the front end joined portion to the rear end joined portion at the base cloths.

In the third aspect of the present disclosure, the deformation restricting member that is disposed within the side airbag as described above limits the inflation of the side airbag in the vehicle transverse direction. Due thereto, the side airbag can be inflated and expanded in a flat shape whose inflated width in the vehicle transverse direction is small. Further, the cloth body, which is disposed at the vehicle occupant side of the side airbag that has inflated and expanded, spans between the front end joined portion and the rear end joined portion at the base cloths of the side airbag. The length of this cloth body is set to be shorter than the length from the front end joined portion to the rear end joined portion at the above-described base cloths. Due to the cloth body being stretched, the side airbag that has inflated and expanded in a flat shape as described above curves so as to become convex toward the vehicle transverse direction outer side as seen in a plan view, and the vehicle transverse direction inner side surface of the side airbag sinks in toward the vehicle transverse direction outer side as seen in plan view. In this way, because the side airbag that has inflated and expanded is made to be curved as seen in a plan view, the side airbag, whose vehicle transverse direction inner side surface sinks in toward the vehicle transverse direction outer side as seen in plan view, can be made to be a simple structure.

In a vehicle side airbag device relating to a fourth aspect of the present disclosure, in any one of the first through third aspects, in an inflated and expanded state of the side airbag, a region of the cloth body, which region faces at least an upper arm portion of the vehicle occupant, is inclined toward the vehicle transverse direction outer side while heading toward a vehicle upper side or a vehicle front side.

In the fourth aspect of the present disclosure, when the side airbag inflates and expands, the region of the cloth body, which region faces at least the upper arm portion of the vehicle occupant, is inclined toward the vehicle transverse direction outer side while heading toward the vehicle upper side or the vehicle front side. Therefore, when the cloth body contacts the upper arm portion of the vehicle occupant in the first half of a side collision, the upper arm portion slides along the surface of the cloth body that is inclined as described above, and is pushed away toward the vehicle upper side or the vehicle front side. As a result, it can be made such that the upper arm portion is not sandwiched between the side airbag and the chest portion, and therefore, load to the chest portion (chest flexure) can be reduced as compared with a case in which the upper arm portion is sandwiched-in.

In a vehicle side airbag device relating to a fifth aspect of the present disclosure, in the fourth aspect, an upper edge portion of the cloth body is connected to the side airbag at a bottom surface of an indentation that is formed at the vehicle transverse direction inner side surface of the side airbag, which is in an inflated and expanded state.

In accordance with the fifth aspect of the present disclosure, the vehicle transverse direction inner side surface, which faces the vehicle occupant, of the side airbag that has inflated and expanded is a shape that is sunken in toward the vehicle transverse direction outer side as seen in a plan view, and the cloth body, which is disposed at the vehicle occupant side with respect to the side airbag, is stretched between the front and rear both end portions of the side airbag. The upper edge portion of this cloth body is connected to the side airbag at the bottom surface of the indentation that is formed at the vehicle transverse direction inner side surface of the side airbag. Due thereto, the region of the cloth body, which region faces at least the upper arm portion of the vehicle occupant, can be inclined toward the vehicle transverse direction outer side while heading toward the vehicle upper side.

In a vehicle side airbag device relating to a sixth aspect of the present disclosure, in the fourth aspect that is in the first or second aspect, the side airbag has a main air chamber that inflates and expands toward a region between the upper body of the vehicle occupant and the vehicle side portion, and a rear end inner air chamber that inflates and expands toward a region between a rear end portion of the main air chamber and the upper body of the vehicle occupant, and the cloth body spans between a front end portion of the main air chamber and the rear end inner air chamber.

In accordance with the sixth aspect of the present disclosure, the side airbag has the main air chamber that inflates and expands toward the region between the upper body of the vehicle occupant and the vehicle side portion, and the rear end inner air chamber that inflates and expands toward the region between the rear end portion of the main air chamber and the upper body of the vehicle occupant. Further, the cloth body spans between the front end portion of the main air chamber and the rear end inner air chamber. Due thereto, the cloth body can be inclined toward the vehicle transverse direction outer side while heading toward the vehicle front side.

A method of manufacturing a vehicle side airbag device relating to a seventh aspect of the present disclosure is a method of manufacturing the vehicle side airbag device of any one of the first through sixth aspects, and includes: a first folding step of folding over a front portion of the side airbag toward a rear end side of the side airbag and the cloth body side; a second folding step of folding over an upper portion of the side airbag toward a lower end side of the side airbag and the cloth body side, and folding over a lower portion of the side airbag toward an upper end side of the side airbag and the cloth body side; and a third folding step of rolling the side airbag from a front end side toward a rear end side with the cloth body disposed at an inner side.

The vehicle side airbag device that is manufactured by the seventh aspect of the present disclosure is the vehicle side airbag device of any one of the first through sixth aspects, and therefore exhibits the operation and effects that are described above. Moreover, in this vehicle side airbag device, the side airbag is folded up by the above-described first through third folding steps. At the time of a side collision of the vehicle, this side airbag inflates and expands toward the vehicle front side while being unrolled, and thereafter, the upper portion and the lower portion inflate and expand toward the vehicle vertical direction both sides. At this time, the upper portion and the lower portion of the side airbag inflate and expand toward the vehicle vertical direction both sides from the side of the cloth body that is disposed at the vehicle occupant side (the vehicle transverse direction inner side) with respect to the side airbag. Due thereto, it is difficult for the upper portion and the lower portion of the side airbag to interfere with the vehicle side portion at the time of inflation and expansion, and therefore, for example, the inflation and expansion of the side airbag can be advanced.

A method of manufacturing a vehicle side airbag device relating to an eighth aspect of the present disclosure is a method of manufacturing the vehicle side airbag device of any one of the first through sixth aspects, and includes: a first folding step of folding over a front portion of the side airbag toward a rear end side of the side airbag and the cloth body side; a second folding step of folding over an upper portion of the side airbag toward a lower end side of the side airbag and a side opposite the cloth body, and folding over a lower portion of the side airbag toward an upper end side of the side airbag and the side opposite from the cloth body; and a third folding step of rolling the side airbag from a front end side toward a rear end side with the cloth body disposed at an inner side.

The vehicle side airbag device that is manufactured by the eighth aspect of the present disclosure is the vehicle side airbag device of any one of the first through sixth aspects, and therefore exhibits the operation and effects that are described above. Moreover, in this vehicle side airbag device, the side airbag is folded up by the above-described first through third folding steps. At the time of a side collision of the vehicle, this side airbag inflates and expands toward the vehicle front side while being unrolled, and thereafter, the upper portion and the lower portion inflate and expand toward the vehicle vertical direction both sides. At this time, the upper portion and the lower portion of the side airbag inflate and expand toward the vehicle vertical direction both sides from the side opposite the cloth body (the vehicle transverse direction outer side) that is disposed at the vehicle occupant side (the vehicle transverse direction inner side) with respect to the side airbag. Due thereto, from the initial stage of the inflation and expansion of the side airbag, the cloth body faces the upper body of the vehicle occupant so as to be able to contact the upper body. Therefore, even if, for some reason, the cloth body and the side airbag approach the upper body of the vehicle occupant earlier than planned, the cloth body can be made to contact the upper body of the vehicle occupant. As a result, the side airbag that is in the initial stage of inflation and expansion contacting the upper body of the vehicle occupant inadvertently, and the load to the upper body of the vehicle occupant increasing suddenly, can be prevented or suppressed.

As described above, in accordance with the vehicle side airbag device and the method of manufacturing thereof relating to the present disclosure, a stable vehicle occupant restraining performance is obtained even in a case in which a vehicle occupant tilts forward due to braking of the vehicle or the like at the time of a side collision.

BRIEF DESCRIPTION OF THE DRAWINGS

Exemplary embodiments of the present disclosure will be described in detail based on the following figures, wherein:

FIG. 7 is a graph showing the relationship between load, which is applied to the vehicle occupant from the side airbag and the cloth body relating to the first embodiment, and time after a side collision;

FIG. 9C is a plan sectional view that corresponds to FIG. 9A and FIG. 9B and shows a vehicle occupant restraining state, in the second half of a side collision, by the side airbag and the cloth body relating to the first embodiment;

FIG. 12B is a side view that corresponds to FIG. 1 and shows the inflated and expanded state of the side airbag relating to the second embodiment;

DETAILED DESCRIPTION

First Embodiment

Figure 1:
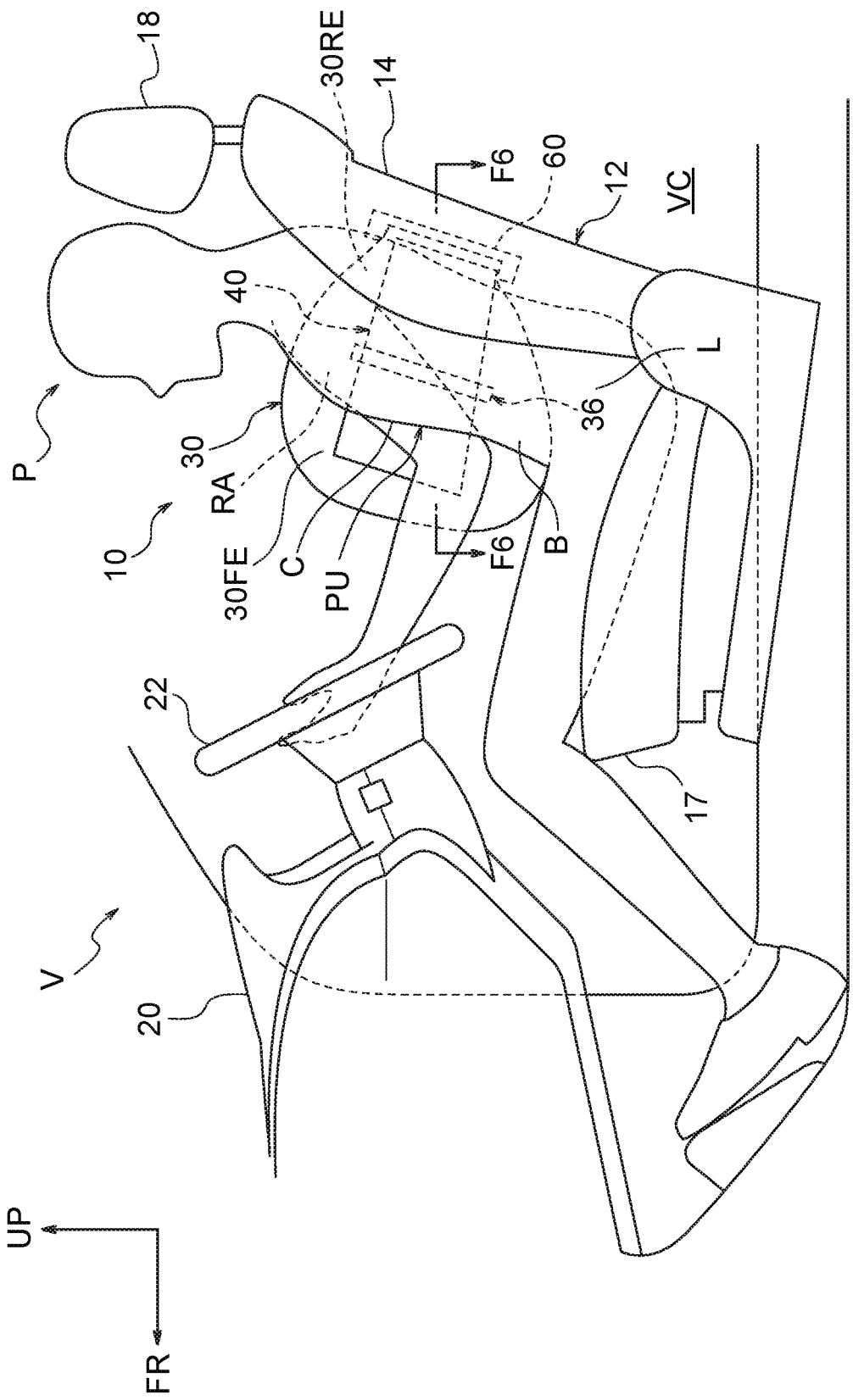
FIG. 1 is a side view in which a vehicle cabin front portion of a vehicle, to which a vehicle side airbag device relating to a first embodiment of the present disclosure is applied, is seen from a vehicle left side, and is a drawing showing an inflated and expanded state of a side airbag.

A vehicle side airbag device 10 relating to a first embodiment of the present disclosure, and a method of manufacturing thereof, are described hereinafter by using FIG. 1 through FIG. 9C. Note that arrow FR, arrow UP and arrow OUT that are shown appropriately in the respective drawings indicate the forward direction (the advancing direction) of the vehicle, the upward direction, and outward in the vehicle transverse direction, respectively. Hereinafter, when description is given by merely using longitudinal, left-right and vertical directions, they refer to the longitudinal of the vehicle longitudinal direction, the left and right of the vehicle left-right direction (the vehicle transverse direction), and the vertical of the vehicle vertical direction, unless otherwise specified. Further, there are cases in which illustration of some members and some reference numerals are omitted from some of the drawings in order to make the drawings easier to understand.

(Structure)

Figure 8:
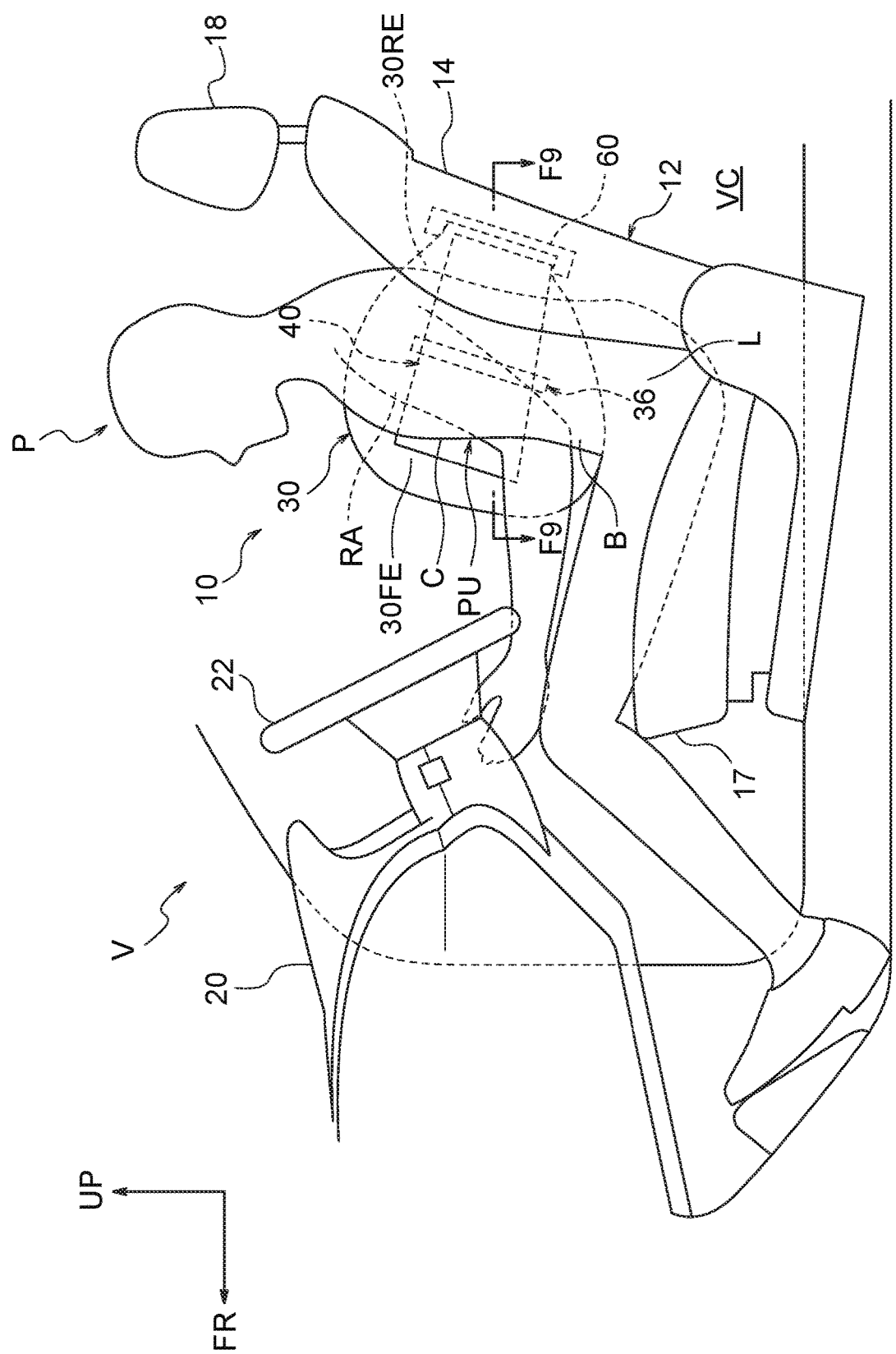
FIG. 8 is a side view that corresponds to FIG. 1 and shows a state in which the vehicle occupant is tilting forward.

As shown in FIG. 1, FIG. 6A through FIG. 6D, FIG. 8, and FIG. 9A through FIG. 9C, the vehicle side airbag device 10 relating to the present embodiment is installed in an outer-side side portion 14A that is the side portion at the vehicle transverse direction outer side of a seatback 14 of a vehicle seat 12. As shown in FIG. 1 and FIG. 8, the lower end portion of the seatback 14 is tiltably connected to the rear end portion of a seat cushion 17, and a headrest 18 is connected to the upper end portion of the seatback 14. The vehicle seat 12 is disposed at the right side at the front portion of a vehicle cabin VC of a vehicle V. The longitudinal, left-right, and vertical directions of the vehicle seat 12 coincide with the longitudinal, left-right and vertical directions of the vehicle V.

Note that, in a case in which the vehicle seat 12 is disposed at the left side of the vehicle cabin VC, the structure has left-right symmetry with respect to that of the present embodiment. Further, vehicle occupant P shown in FIG. 1, FIG. 6A through FIG. 6D, FIG. 8 and FIG. 9A through FIG. 9C has a build that is equivalent to that of an AM 50 (50th percentile U.S. adult male) dummy. Further, in FIG. 1 and FIG. 8, 20 is the instrument panel of the vehicle V, and 22 is the steering wheel of the vehicle V.

As shown in FIG. 6A through FIG. 6D and FIG. 9A through FIG. 9C, the seatback 14 of the vehicle seat 12 has a seatback frame 15, an unillustrated seatback pad that is placed on the seatback frame 15, and a seatback skin 16 that covers the seatback pad. The seatback frame 15 is structured to include an outer-side side frame 15A that extends in the vertical direction of the seatback 14 within the outer-side side portion 14A, and an inner-side side frame 15B that extends in the vertical direction of the seatback 14 within an inner-side side portion 14B that is the side portion at the vehicle transverse direction central side of the seatback 14.

As shown in FIG. 1 through FIG. 3, FIG. 6A through FIG. 6D, and FIG. 9A through FIG. 9C, the vehicle side airbag device 10 has a side airbag 30 that inflates and expands between an upper body PU of the vehicle occupant P and a vehicle side portion (here, a door trim 24A of a side door 24 that is shown in FIG. 6A through FIG. 6D and FIG. 9A through FIG. 9C) at the time of a side collision of the vehicle V, and a cloth body (cloth-like body, planar body) 40 that spans between the front and rear both end portions of the side airbag 30. Further, the vehicle side airbag device 10 has an unillustrated inflator that supplies gas for inflation and expansion into the side airbag 30 at the time of a side collision of the vehicle V, and a case 60 in which the side airbag 30 and the inflator are accommodated.

Note that the longitudinal and vertical directions of the side airbag 30 that are mentioned in the following description refer to the directions in the inflated and expanded state of the side airbag 30 unless otherwise specified, and substantially coincide with the longitudinal and vertical directions of the seatback 14. Further, in the present embodiment, the "inflated and expanded state" and "state in which inflation and expansion are completed" have the same meaning. First, a summary of the overall structure of the vehicle side airbag device 10 is given, and then the structures of the side airbag 30 and the cloth body 40, which are main portions of the present embodiment, are described in detail.

The side airbag 30 is formed in the shape of a bag, and inflates and expands substantially in the shape of an ellipse whose length runs along the vehicle longitudinal direction, and is interposed between the vehicle occupant P and the door trim 24A. This side airbag 30 is formed to a size that can restrain the upper body PU of the vehicle occupant P. Concretely, the side airbag 30 is set to a size that can restrain a chest portion C and an abdominal region B (refer to FIG. 1, FIG. 2 and FIG. 8) and an upper right arm portion RA (refer to FIG. 6A through FIG. 6D and FIG. 9A through FIG. 9C) of the vehicle occupant P. The upper right arm portion RA corresponds to the "upper arm portion" in the present disclosure. Note that illustration of an upper left arm portion LA of the vehicle occupant P is omitted in FIG. 1 and FIG. 8. Further, the size of the side airbag 30 is not limited to that described above, and can be changed appropriately. For example, there may be a structure in which the side airbag 30 is formed to a size that can restrain a lumbar region L, and not only the upper body PU of the vehicle occupant P.

The unillustrated inflator is a cylinder-type inflator, and is accommodated at the rear end portion of the side airbag 30 interior in a posture that is such that the axial direction of the inflator runs along the vertical direction of the seatback 14. An unillustrated airbag ECU (control device) is electrically connected to the inflator. An unillustrated collision sensor (or sensor group), which senses or predicts (forecasts) a side collision of the vehicle V, is electrically connected to the airbag ECU. At the time when the airbag ECU senses or predicts a side collision of the vehicle V on the basis of information from the collision sensor, the airbag ECU operates (activates) the inflator. Due thereto, the inflator generates gas at the interior of the side airbag 30.

The case 60 is formed in the shape of a cylindrical tube whose axial direction both end portions are closed, and is disposed within the outer-side side portion 14A in a posture that is such that the axial direction of the case 60 runs along the vertical direction of the seatback 14. The side airbag 30, which has been folded up by a way of folding (a folding method) that is described later, is accommodated within the case 60 together with the inflator. The case 60 is disposed at the vehicle transverse direction outer side with respect to the outer-side side frame 15A. A pair of upper and lower stud bolts, which are not illustrated and are provided at the inflator, are passed-through the base cloths of the side airbag 30 and the outer-side side frame 15A, and are screwed-together with unillustrated nuts. Due thereto, the side airbag 30 and the case 60 are fastened and fixed to the outer-side side frame 15A by using the inflator. An opening portion 60A, which is shaped as an elongated rectangle whose length runs along the vertical direction of the seatback 14, is formed in the front surface of the case 60. The side airbag 30 inflates and expands toward the vehicle front side through this opening portion 60A. At the time of this inflation and expansion, the seatback pad and the seatback skin 16 that are disposed at the outer-side side portion 14A receive the inflation pressure of the side airbag 30 and are broken.

Main Portions of Present Embodiment

Figure 4A:
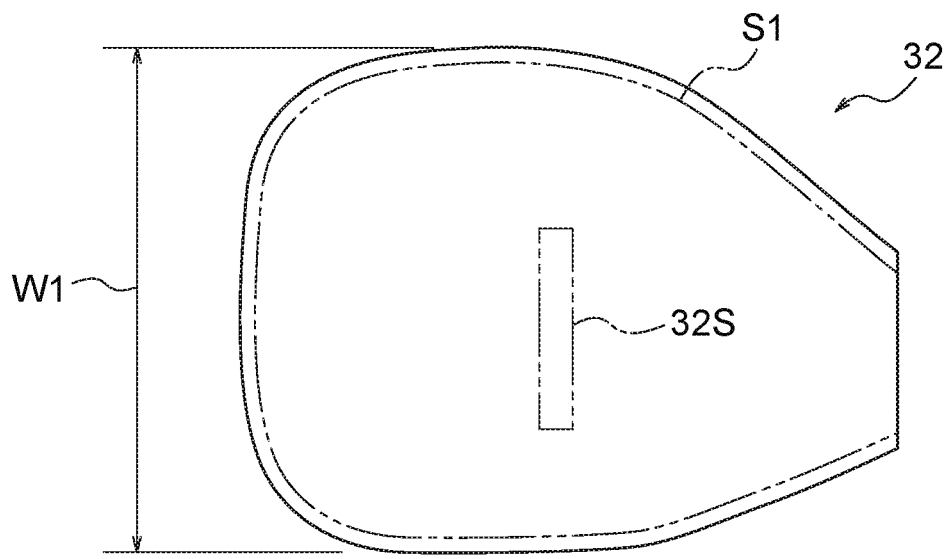
FIG. 4A is a plan development showing an outer side base cloth of the side airbag relating to the first embodiment.
Figure 4B:
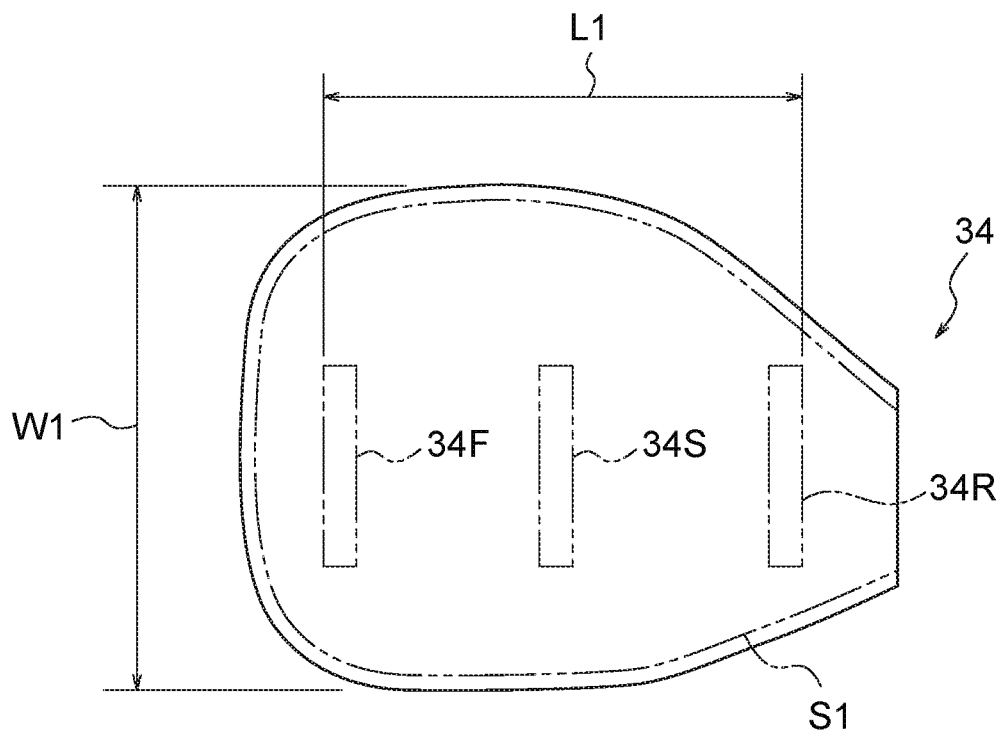
FIG. 4B is a plan development showing an inner side base cloth of the side airbag relating to the first embodiment.
Figure 4C:
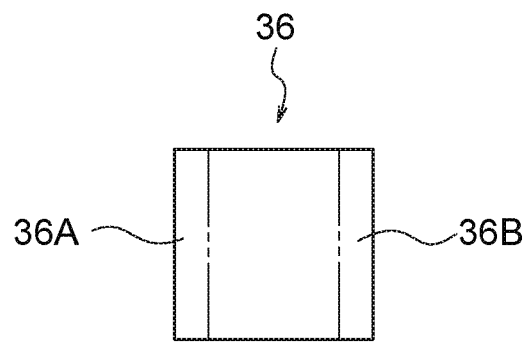
FIG. 4C is a plan development showing a deformation restricting member of the side airbag relating to the first embodiment.
Figure 4D:
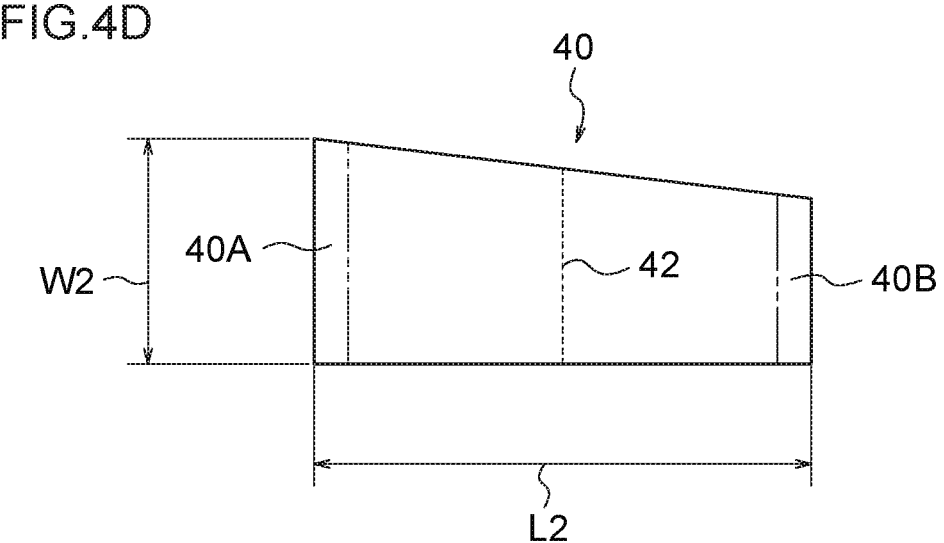
FIG. 4D is a plan development showing a cloth body relating to the first embodiment.

Main portions of the present embodiment are described next. The above-described side airbag 30 has an outer side base cloth 32 (refer to FIG. 4A) and an inner side base cloth 34 (refer to FIG. 4B) that are formed by, for example, a nylon or polyester cloth material being cut-out in substantially elliptical shapes. The side airbag 30 is formed in the shape of a bag due to the outer side base cloth 32 and the inner side base cloth 34 being superposed one on the other, and the outer peripheral edge portions thereof being sewn together at an unillustrated outer peripheral sewn portion. Note that virtual line S1 that is shown in FIG. 4A and FIG. 4B is the sewing line at the outer peripheral edge portions of the outer side base cloth 32 and the inner side base cloth 34. In the state in which the side airbag 30 is inflated and expanded, the outer side base cloth 32 that is disposed at the vehicle transverse direction outer side (the side door 24 side), and the inner side base cloth 34 that is disposed at the vehicle transverse direction inner side (the vehicle occupant P side), face one another in the vehicle transverse direction. Note that the method of manufacturing the side airbag 30 is not limited to that described above, and can be changed. For example, there may be a structure in which the side airbag 30 is manufactured by folding a single base cloth in two and sewing the peripheral edge portion thereof.

A strap 36 (refer to FIG. 4C) that serves as a deformation restricting member (an inflation limiting cloth) is disposed within the side airbag 30. This strap 36 is formed by, for example, a cloth material that is similar to that of the outer side base cloth 32 and the inner side base cloth 34 being cut-out in a rectangular form. As shown in FIG. 1 through FIG. 3, FIG. 6B through FIG. 6D, FIG. 8, and FIG. 9A through FIG. 9C, the strap 36 is disposed so as to extend in the vehicle vertical direction at the central portion in the vehicle longitudinal direction of the interior of the side airbag 30 that is in the inflated and expanded state, and connects the outer side base cloth 32 and the inner side base cloth 34.

Concretely, a one end portion 36A (reference numeral shown only in FIG. 4C) of the strap 36, and an outer side joined portion 32S (reference numeral shown only in FIG. 4A) that is set at the central portion of the outer side base cloth 32, are sewn (joined) together at sewn portion S2 (shown only in FIG. 6B through FIG. 6D and FIG. 9A through FIG. 9C). Further, another end portion 36B (reference numeral shown only in FIG. 4C) of the strap 36, and an inner side joined portion 34S (reference numeral shown only in FIG. 4B) that is set at the central portion of the inner side base cloth 34, are sewn (joined) together at sewn portion S3 (shown only in FIG. 6B through FIG. 6D and FIG. 9A through FIG. 9C). In the state in which the side airbag 30 is inflated and expanded, the strap 36 is stretched in the vehicle transverse direction, and limits the inflation of the central portion of the side airbag 30. Due thereto, the side airbag 30 inflates and expands in a flat shape at which the inflated width in the vehicle transverse direction is small.

Further, in the present embodiment, the cloth body 40 (refer to FIG. 4D) spans between a front end portion 30FE and a rear end portion 30RE of the side airbag 30. This cloth body 40 is formed by, for example, a cloth material that is similar to that of the outer side base cloth 32 and the inner side base cloth 34 being cut-out in the shape of an elongated rectangle. The cloth body 40 is attached to the side airbag 30 so as to be positioned at the vehicle occupant P side (the vehicle transverse direction central side) with respect to the side airbag 30 that has inflated and expanded. Note that the material of the cloth body 40 is not limited to a cloth material, and may be a material that is sheet-like and is flexible.

Concretely, a length direction one end portion 40A of the cloth body 40, and a front end joined portion 34F (reference numeral shown only in FIG. 4B) that is set at the front end portion of the inner side base cloth 34, are sewn (joined) together at sewn portion S4 (shown only in FIG. 6B through FIG. 6D and FIG. 9A through FIG. 9C). Further, a length direction other end portion 40B of the cloth body 40, and a rear end joined portion 34R (reference numeral shown only in FIG. 4B) that is set at the rear end portion of the inner side base cloth 34, are sewn (joined) together at sewn portion S5 (shown only in FIG. 6B through FIG. 6D and FIG. 9A through FIG. 9C). Namely, the cloth body 40 is attached to the side airbag 30 with the length direction of the cloth body 40 being the longitudinal direction of the side airbag 30.

The length of this cloth body 40 in the longitudinal direction is set to be shorter than the length, in the longitudinal direction, of the side airbag 30 that is in a planarly unfolded state. Concretely, length (longitudinal length) L2 (refer to FIG. 4D and FIG. 6B) of the cloth body 40 is set to be shorter than length L1 (refer to FIG. 4B and FIG. 6B) from the front end joined portion 34F to the rear end joined portion 34R of the inner side base cloth 34 (L1>L2). Therefore, in the state in which the side airbag 30 is inflated and expanded, the cloth body 40 is stretched in the vehicle longitudinal direction between the front and rear both end portions 30FE, 30RE of the side airbag 30 (refer to FIG. 6B and FIG. 9A). Due thereto, the side airbag 30, which inflates and expands in a flat shape as described above, becomes convex toward the vehicle transverse direction outer side as seen in a plan view, and curves in an arch-like form. As a result, at the side airbag 30 that is in the inflated and expanded state, the inner side base cloth 34 that forms the vehicle transverse direction inner side surface sinks in toward the vehicle transverse direction outer side as seen in a plan view. Namely, an indentation (concave portion) 30H that is sunken in toward the vehicle transverse direction outer side is formed at the vehicle transverse direction inner side surface (the inner side base cloth 34) of the side airbag 30 that is in the inflated and expanded state. Further, the cloth body 40 that is stretched as described above becomes rectilinear as seen in a plan view, and a gap 50 is formed between the cloth body 40 and the inner side base cloth 34 of the side airbag 30.

Further, at the cloth body 40, width W2 along the vertical direction of the side airbag 30 is set to be shorter than (here, around half of) vertical width W1 of the inner side base cloth 34 and the outer side base cloth 32 (W1>W2). The cloth body 40 is attached to the vertical direction central portion of the side airbag 30, and, in the inflated and expanded state of the side airbag 30, is disposed at the same height as the chest portion C of the vehicle occupant P, and faces the upper right arm portion RA of the vehicle occupant P so as to contact or be adjacent to the upper right arm portion RA from the vehicle transverse direction outer side. Namely, in the present embodiment, the cloth body 40 is interposed between the side airbag 30 that has inflated and expanded and the upper right arm portion RA of the vehicle occupant P, and the upper body PU of the vehicle occupant P is covered from the vehicle transverse direction outer side by the cloth body 40 and the side airbag 30.

Further, a perforation 42, which serves as a weak portion and is in a stitch-like form, is formed in the length direction central portion of the cloth body 40. This perforation 42 extends in the vertical direction of the side airbag 30. The perforation 42 is not broken by load (of several tens of Newtons) that is applied to the cloth body 40 at the time when the side airbag 30 inflates and expands, but is broken at the time when a high load (of several hundreds of Newtons) is applied to the cloth body 40 from the vehicle occupant P. In detail, the perforation 42 is not broken by the load at the time when only the upper right arm portion RA of the vehicle occupant P contacts the cloth body 40, and is broken by the load at the time when both the upper right arm portion RA and the torso (the chest portion C and the like) of the vehicle occupant P contact the cloth body 40. Further, when the perforation 42 breaks, the cloth body 40 is severed (divided) into front and rear portions.

Figure 5A:
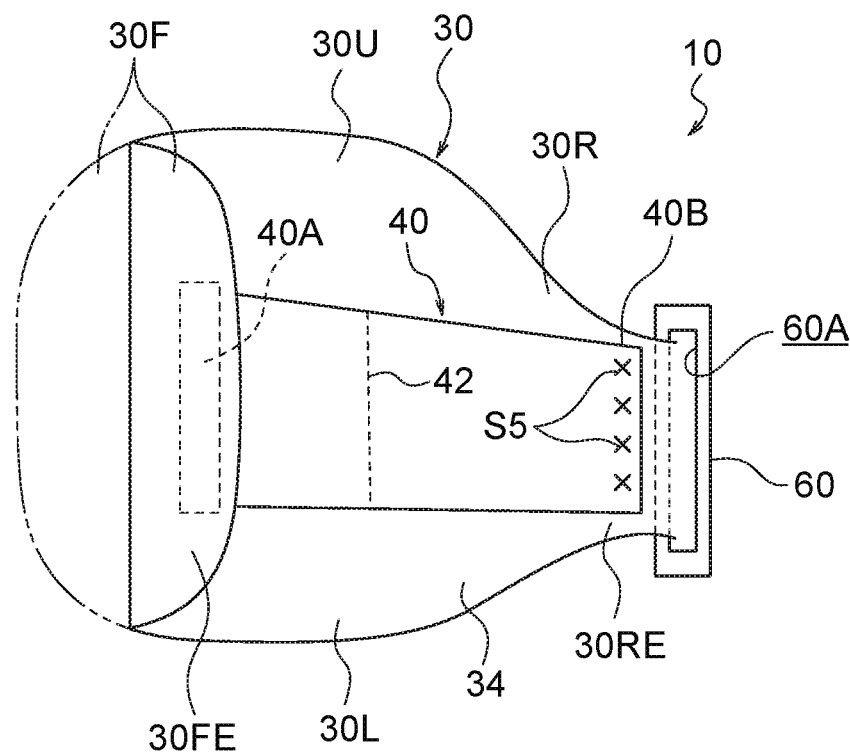
FIG. 5A is a side view showing a first folding step of the side airbag in a method of manufacturing the vehicle side airbag device relating to the first embodiment.

At the time when the vehicle side airbag device 10 of the above-described structure is manufactured, the side airbag 30, at which the above-described cloth body 40 spans between the front and rear both end portions 30FE, 30RE, is folded up by the following first through third folding steps. In the first folding step, as shown in FIG. 5A, a front portion 30F of the side airbag 30 is folded over toward the rear end side of the side airbag 30 (a rear portion 30R side) and the cloth body 40 side. The front end portion 30FE of the side airbag 30 is included in this front portion 30F.

Figure 5B:
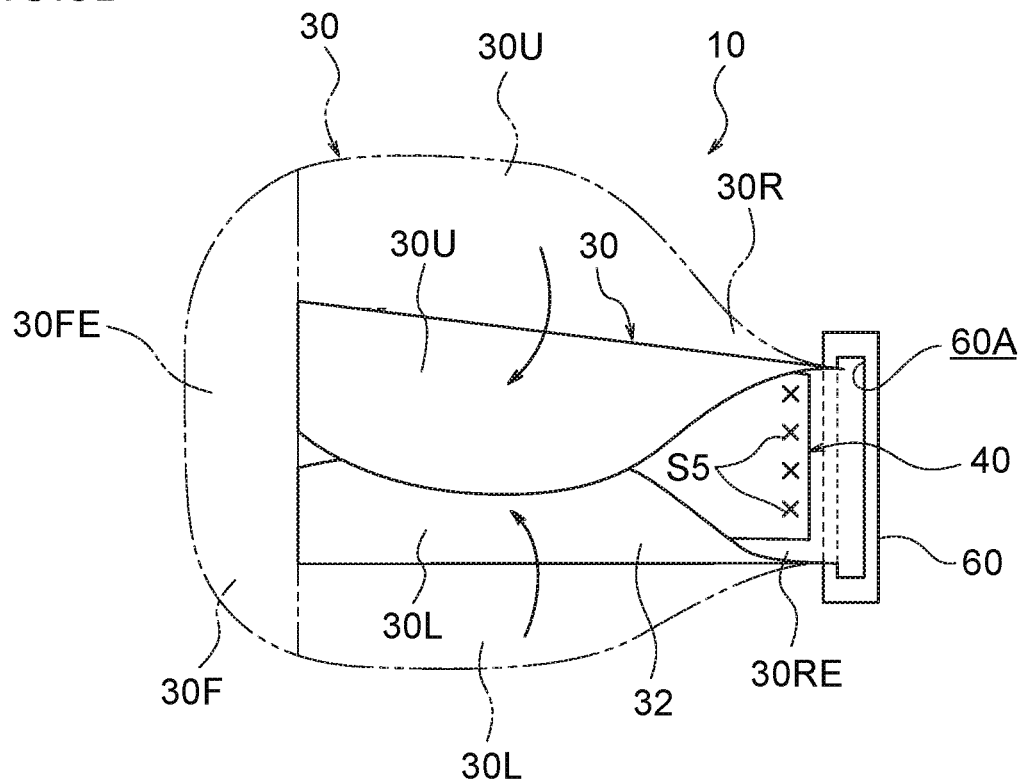
FIG. 5B is a side view showing a second folding step of the side airbag in the manufacturing method.

Next, in the second folding step, as shown in FIG. 5B, an upper portion 30U of the side airbag 30 is folded over toward the lower end side of the side airbag 30 (a lower portion 30L side) and the cloth body 40 side, and the lower portion 30L of the side airbag 30 is folded over toward the upper end side of the side airbag 30 (the upper portion 30U side) and the cloth body 40 side. In this case, the upper portion 30U of the side airbag 30 is superposed on the outer side of the lower portion 30L, and the side airbag 30 is folded in three parts vertically. Note that there may be a structure in which the lower portion 30L of the side airbag 30 is superposed on the outer side of the upper portion 30U, and the side airbag 30 is folded in three parts vertically.

Figure 5C:
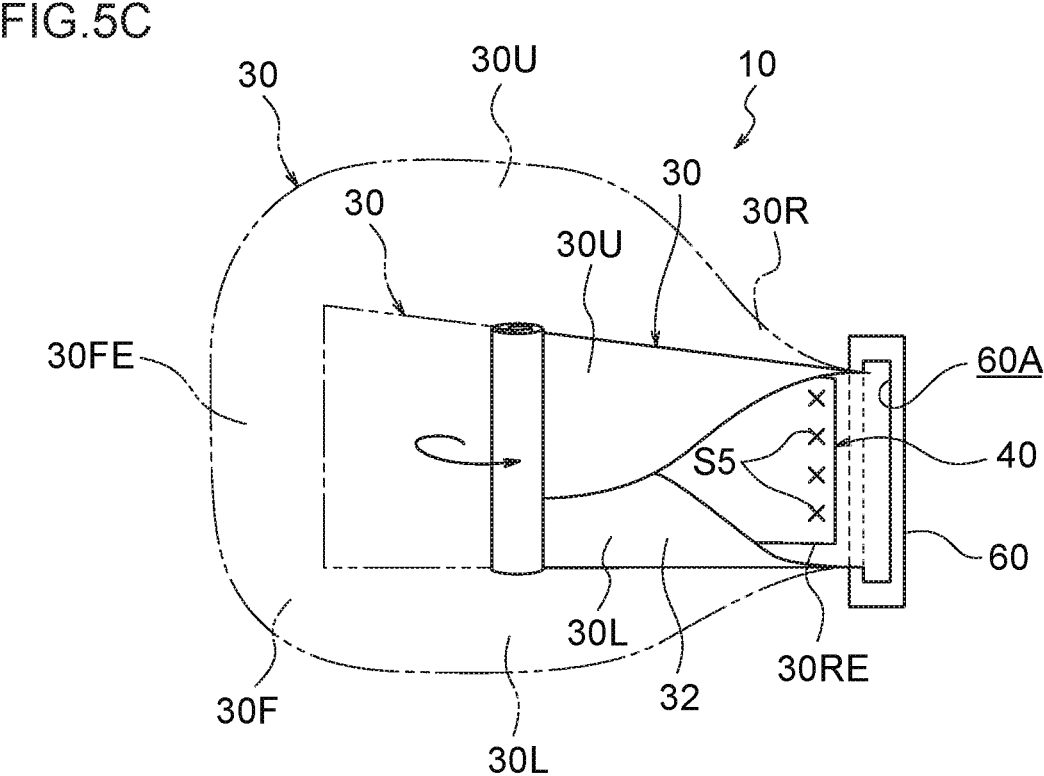
FIG. 5C is a side view showing a third folding step of the side airbag in the manufacturing method.
Figure 5D:
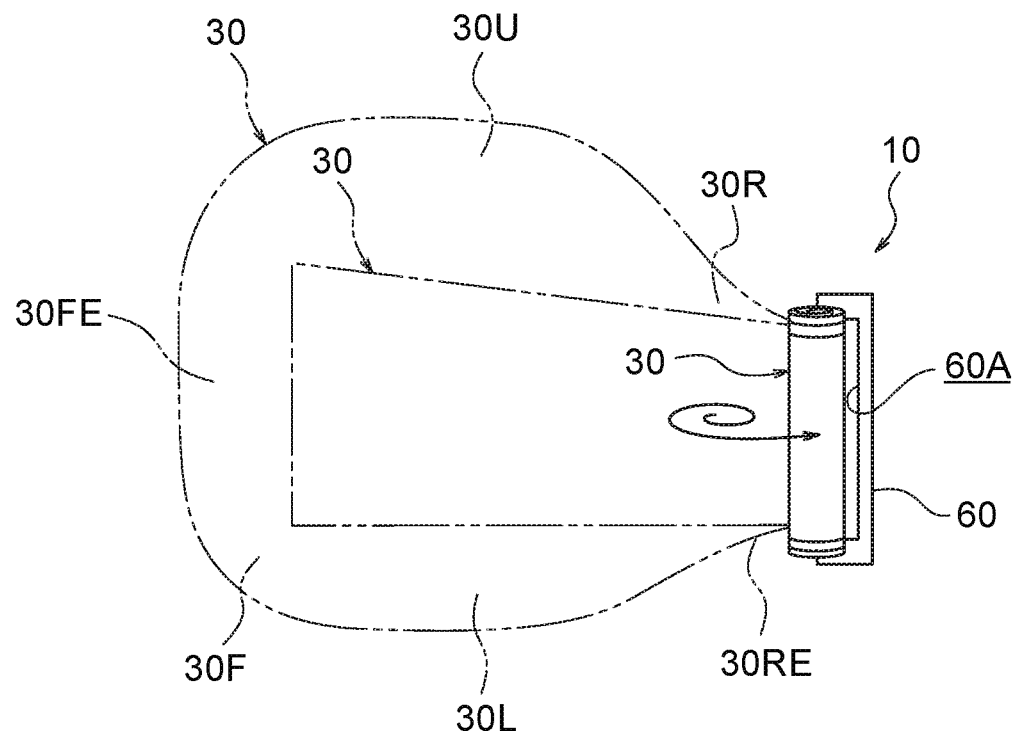
FIG. 5D is a side view showing the side airbag after the third folding step in the manufacturing method.

Next, in the third folding step, as shown in FIG. 5C, the side airbag 30 is rolled from the front end side toward the rear end side with the cloth body 40 being at the inner side. The rolled-up side airbag 30 (refer to FIG. 5D) is accommodated within the case 60 from the opening portion 60A of the case 60.

(Operation and Effects)

Operation and effects of the present first embodiment are described next.

Figure 6A:
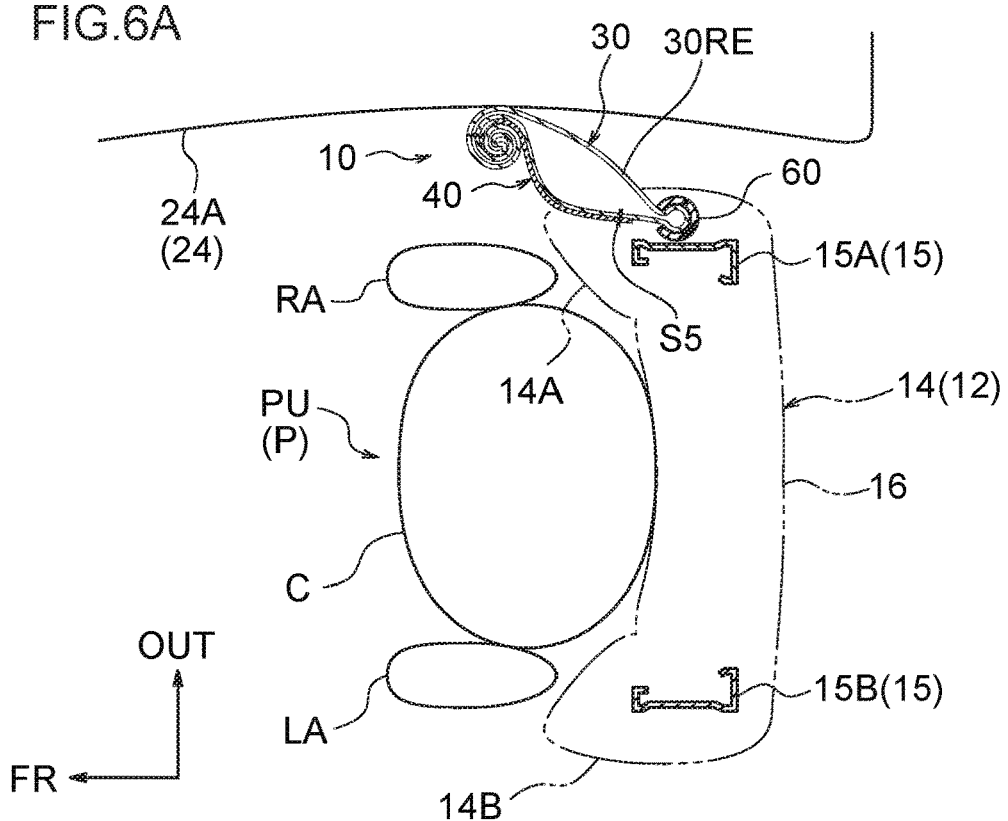
FIG. 6A is a plan sectional view at the height of line F6-F6 of FIG. 1, showing a state in the midst of inflation and expansion of the side airbag relating to the first embodiment.
Figure 6B:
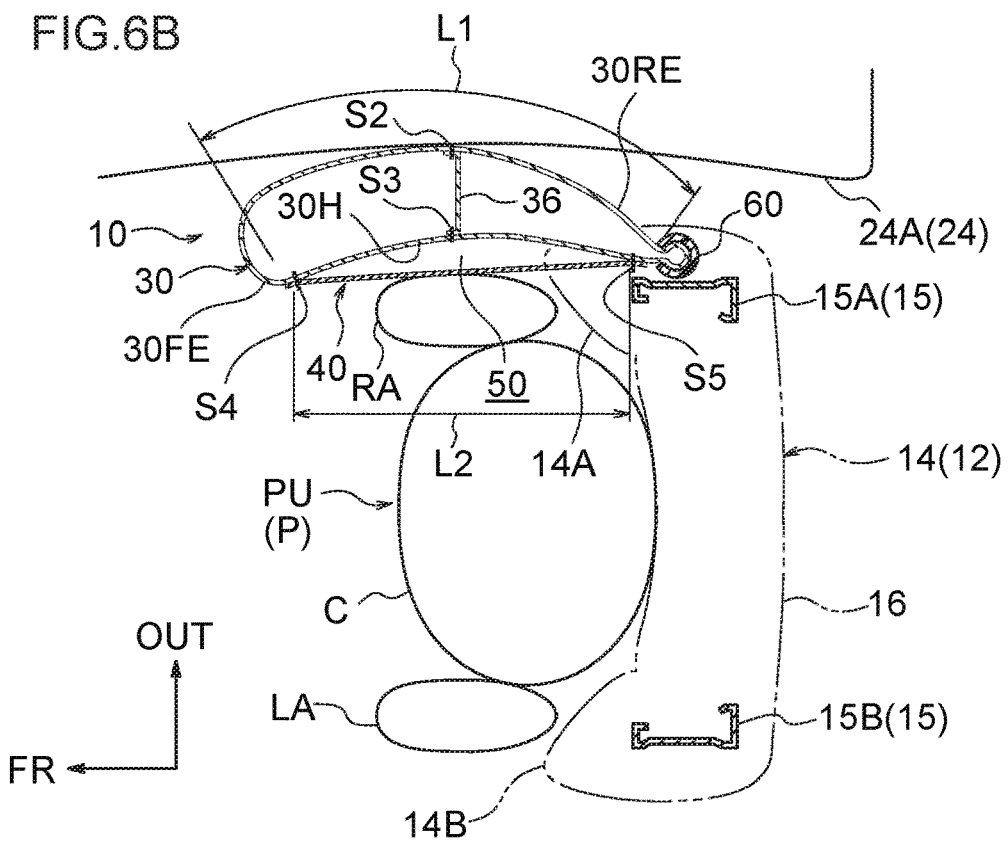
FIG. 6B is a plan sectional view that corresponds to FIG. 6A and shows a state in which inflation and expansion of the side airbag relating to the first embodiment is completed.

In the vehicle side airbag device 10 of the above-described structure, when the airbag ECU senses or predicts a side collision of the vehicle V on the basis of information from the collision sensor, the inflator is operated, and gas is supplied into the side airbag 30. Due thereto, as shown in FIG. 6A, the side airbag 30 is inflated and expanded toward the vehicle front side while being unrolled, and thereafter, the upper portion 30U and the lower portion 30L inflate and expand toward the vehicle vertical direction both sides. As shown in FIG. 6B, the inflated and expanded side airbag 30 is interposed between the upper body PU of the vehicle occupant P and the door trim 24A of the side door 24. Further, the cloth body 40, which is disposed at the vehicle occupant P side with respect to the side airbag 30, is stretched between the front and rear both end portions 30FE, 30RE of the side airbag 30.

Figure 6C:
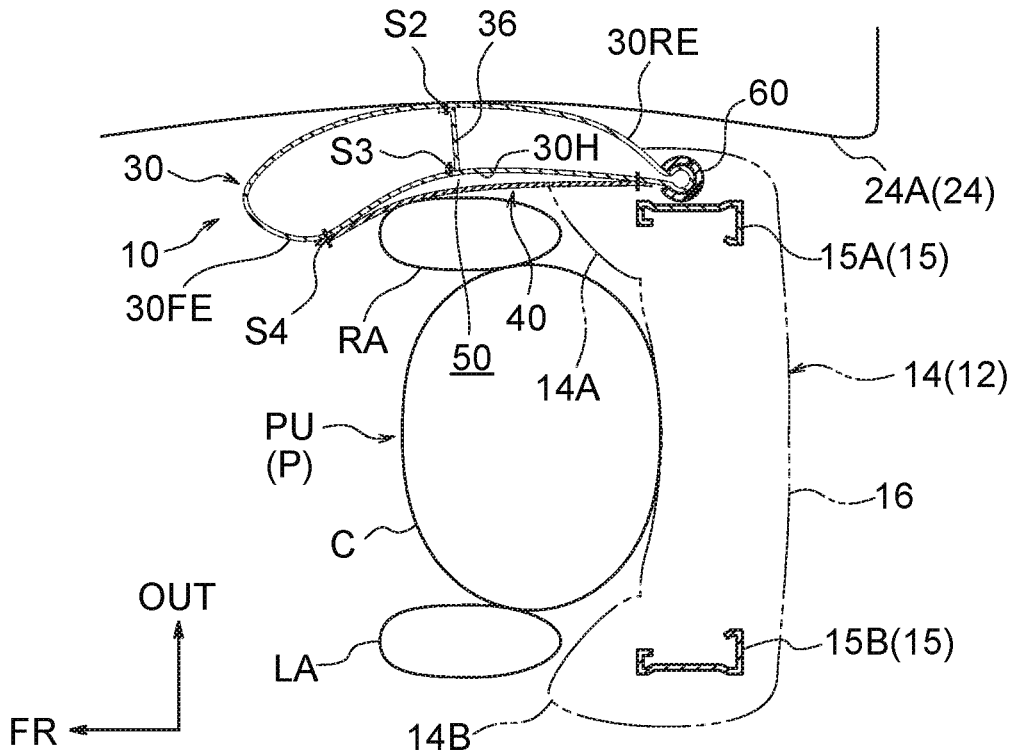
FIG. 6C is a plan sectional view that corresponds to FIG. 6A and FIG. 6B and shows a vehicle occupant restraining state, in the first half of a side collision, by the side airbag and the cloth body relating to the first embodiment.

As shown in FIG. 6B, at the side airbag 30 that has inflated and expanded, the inner side base cloth 34 that faces the vehicle occupant P sinks in toward the vehicle transverse direction outer side (the side opposite the vehicle occupant P) as seen in a plan view, and the gap 50 is formed between the inner side base cloth 34 and the cloth body 40. Therefore, in the first half of the side collision, as shown in FIG. 6C, the upper right arm portion RA of the vehicle occupant P contacts the cloth body 40 that is in a stretched state, and the upper body PU of the vehicle occupant P starts to be pushed-back by a low load.

Figure 6D:
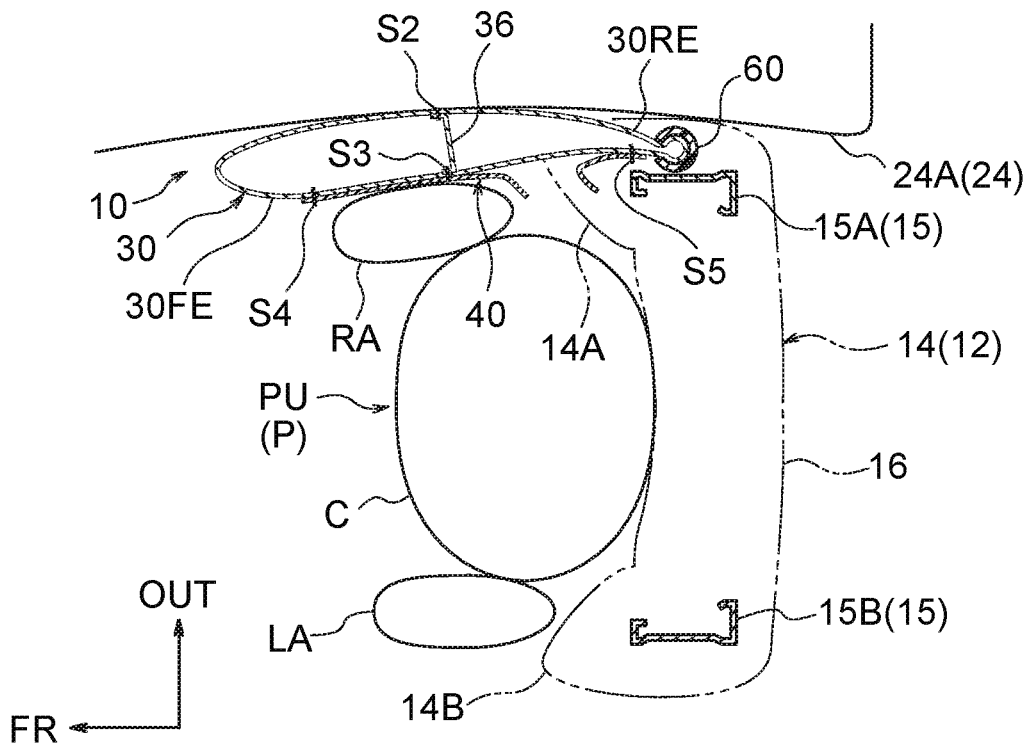
FIG. 6D is a plan sectional view that corresponds to FIG. 6A through FIG. 6C and shows a vehicle occupant restraining state, in the second half of a side collision, by the side airbag and the cloth body relating to the first embodiment.

Then, in the second half of the side collision, the side airbag 30 moves together with the side door 24 toward the vehicle occupant P side (the vehicle transverse direction inner side), and load is applied to the cloth body 40 from the upper right arm portion RA and the torso (the chest portion C and the like) of the vehicle occupant P. Due thereto, as shown in FIG. 6D, the cloth body 40 breaks at the perforation 42, and the upper body PU of the vehicle occupant P is restrained (held) at a high load by the side airbag 30.

In this way, in the present embodiment, in the first half of a side collision, the upper body PU of the vehicle occupant P is restrained at a low load from the cloth body 40, and, in the second half of the side collision, the upper body PU of the vehicle occupant P is restrained at a high load from the side airbag 30 (refer to FIG. 7). Due thereto, the load to the upper body PU of the vehicle occupant P increasing suddenly can be prevented or suppressed. Moreover, even in a case in which the upper right arm portion RA of the vehicle occupant P is sandwiched between the cloth body 40 and the chest portion C in the first half of a side collision, the cloth body 40 pushes the upper right arm portion RA back at a low load, and therefore, the load to the chest portion C can be made to be small.

Figure 9A:
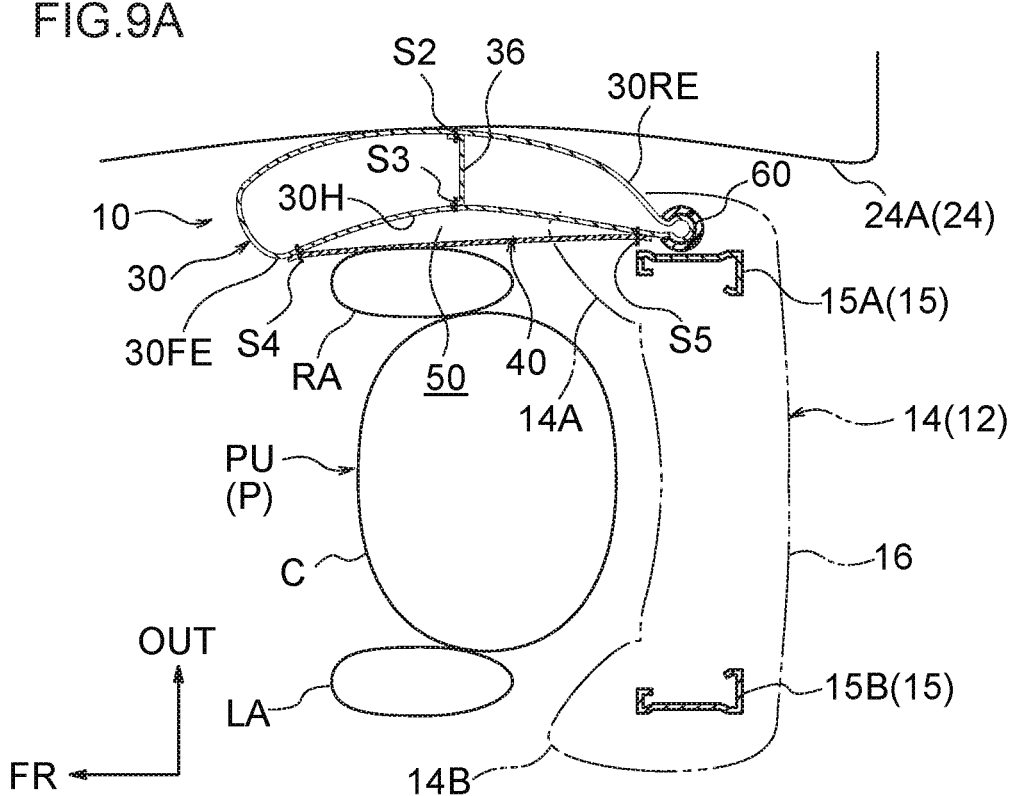
FIG. 9A is a plan sectional view at the height of line F9-F9 of FIG. 8, showing a state in which inflation and expansion of the side airbag relating to the first embodiment is completed.
Figure 9B:
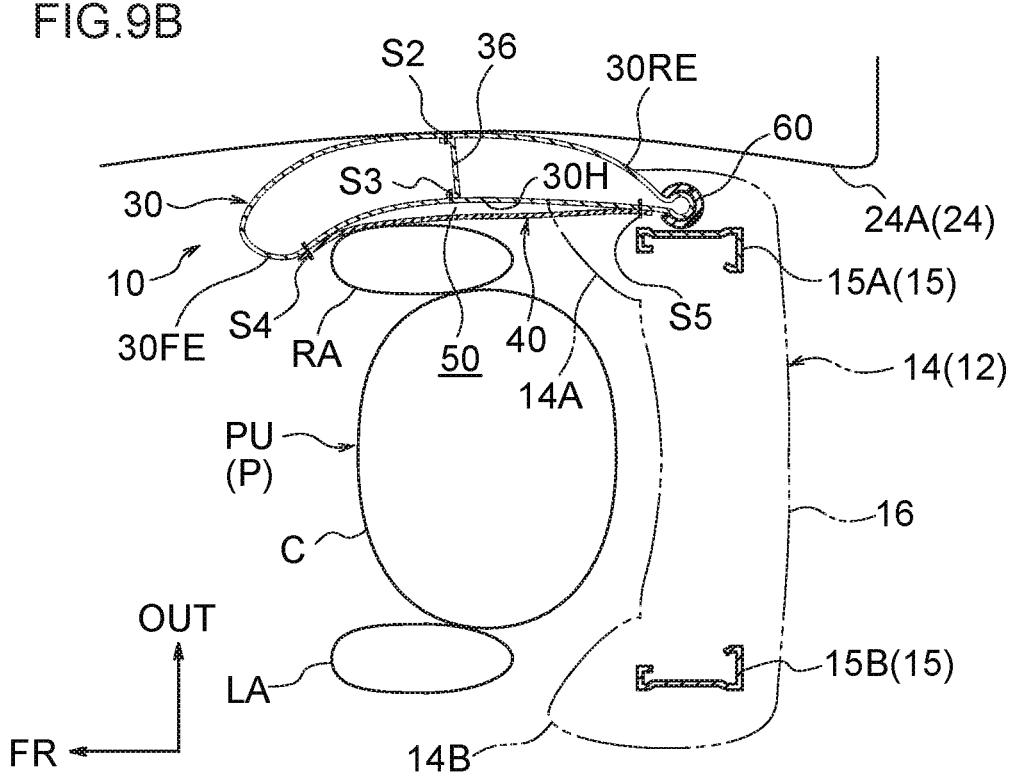
FIG. 9B is a plan sectional view that corresponds to FIG. 9A and shows a vehicle occupant restraining state, in the first half of a side collision, by the side airbag and the cloth body relating to the first embodiment.

Further, in the present embodiment, in a case in which the vehicle occupant P tilts forward due to braking of the vehicle V or the like at the time of a side collision, as shown in FIG. 8, the position of the upper body PU of the vehicle occupant P is offset toward the vehicle V front side with respect to the side airbag 30. In such a case as well, as shown in FIG. 9A, the state of contact between the upper body PU of the vehicle occupant P and the cloth body 40, which is stretched between the front and rear both end portions 30FE, 30RE of the side airbag 30, does not change greatly. Moreover, in the first half of the side collision, when, for example, the upper right arm portion RA of the vehicle occupant P contacts the cloth body 40, as shown in FIG. 9B, the front end portion 30FE of the side airbag 30 is made to move toward the vehicle transverse direction inner side due to the tension of the cloth body 40. Due thereto, it is difficult for the side airbag 30 to come away from the upper body PU of the vehicle occupant P who is tilting forward. Further, in the second half of the side collision, as shown in FIG. 9C, the cloth body 40 breaks at the perforation 42, and the upper body PU of the vehicle occupant P who is tilting forward is restrained appropriately by the side airbag 30. For the above reasons, in accordance with the present embodiment, a stable vehicle occupant restraining performance is obtained even if the vehicle occupant P tilts forward at the time of a side collision.

Further, in the present embodiment, as described above, because the cloth body 40 breaks at the perforation 42 in the second half of a side collision, the chest portion C of the vehicle occupant P being pushed strongly from the cloth body 40 via the upper right arm portion RA can be prevented. Namely, after the cloth body 40 is severed, the side airbag 30, whose vehicle occupant restraining surface is wider than that of the cloth body 40, restrains the wide range of the upper body PU of the vehicle occupant P, and therefore, the restraining load can be prevented from concentrating at a portion of the upper body PU of the vehicle occupant P.

Further, in the present embodiment, the strap 36 that is disposed within the side airbag 30 limits the inflation of the side airbag 30 in the vehicle transverse direction. Therefore, the side airbag 30 can be inflated and expanded in a flat shape at which the inflated width in the vehicle transverse direction is small. Further, the cloth body 40, which is disposed at the vehicle occupant P side of the side airbag 30 that has inflated and expanded, spans between the front end joined portion 34F and the rear end joined portion 34R at the inner side base cloth 34 of the side airbag 30. The length L2 of this cloth body 40 is set to be shorter than the length L1 from the front end joined portion 34F to the rear end joined portion 34R at the inner side base cloth 34. Due to the cloth body 40 being stretched, the side airbag 30, which inflates and expands in a flat shape as described above, curves so as to become convex toward the vehicle transverse direction outer side as seen in a plan view, and the inner side base cloth 34 of the side airbag 30 sinks in toward the vehicle transverse direction outer side as seen in a plan view. In this way, because there is a structure that causes the side airbag 30, which has inflated and expanded, to curve as seen in plan view, the side airbag 30, at which the inner side base cloth 34 sinks in toward the vehicle transverse direction outer side as seen in plan view, can be made to be a simple structure.

Moreover, in the present embodiment, the side airbag 30, at which the cloth body 40 spans between the front and rear both end portions 30FE, 30RE, is manufactured due to the four cloth bodies that are shown in FIG. 4A through FIG. 4D (the outer side base cloth 32, the inner side base cloth 34, the strap 36 and the cloth body 40) being sewn together. Due thereto, the side airbag 30 that has the cloth body 40 and that achieves the above-described effects can be manufactured easily.

Moreover, in the present embodiment, the front portion 30F of the side airbag 30, at which the cloth body 40 spans between the front and rear both end portions 30FE, 30RE, is folded over toward the rear end side and the cloth body 40 side, and the upper portion 30U is folded over toward the lower end side and the cloth body 40 side, and the lower portion 30L is folded over toward the upper end side and the cloth body 40 side, and the side airbag 30 is rolled from the front end side toward the rear end side with the cloth body 40 at the inner side thereof. The side airbag 30 that is folded up in this way inflates and expands toward the vehicle front side while being unrolled, and thereafter, the upper portion 30U and the lower portion 30L inflate and expand toward the vehicle vertical direction both sides. At this time, the upper portion 30U and the lower portion 30L of the side airbag 30 inflate and expand toward the vehicle vertical direction both sides from the cloth body 40 side that is disposed at the vehicle occupant P side (the vehicle transverse direction inner side) with respect to the side airbag 30. Due thereto, it is difficult for the upper portion 30U and the lower portion 30L of the side airbag 30 to interfere with the door trim 24A at the time of inflation and expansion, and therefore, for example, inflation and expansion of the side airbag 30 can be advanced.

Other embodiments of the present disclosure are described next. Note that structures and operation that are basically similar to those of the first embodiment are denoted by the same reference numerals as in the first embodiment, and description thereof is omitted.

Second Embodiment

Figure 2:
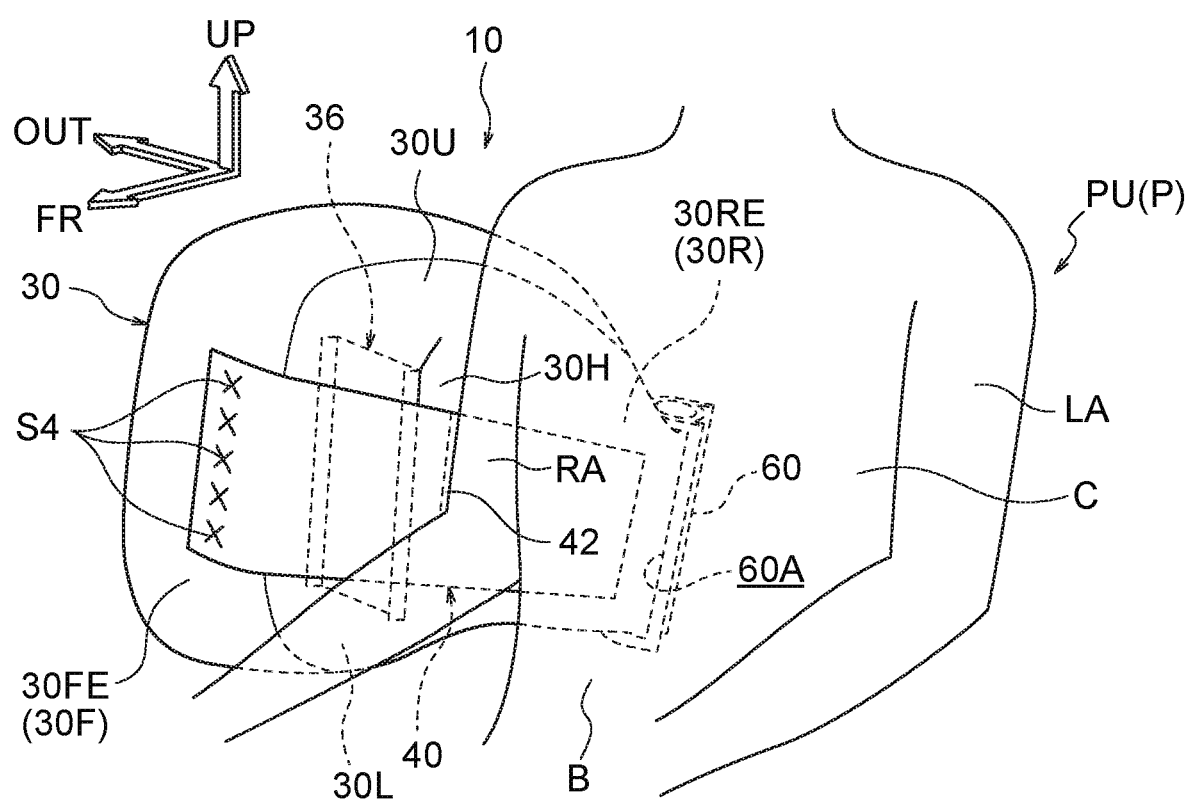
FIG. 2 is a perspective view in which a portion of the structure shown in FIG. 1 is seen from an obliquely front left side of the vehicle.
Figure 3:
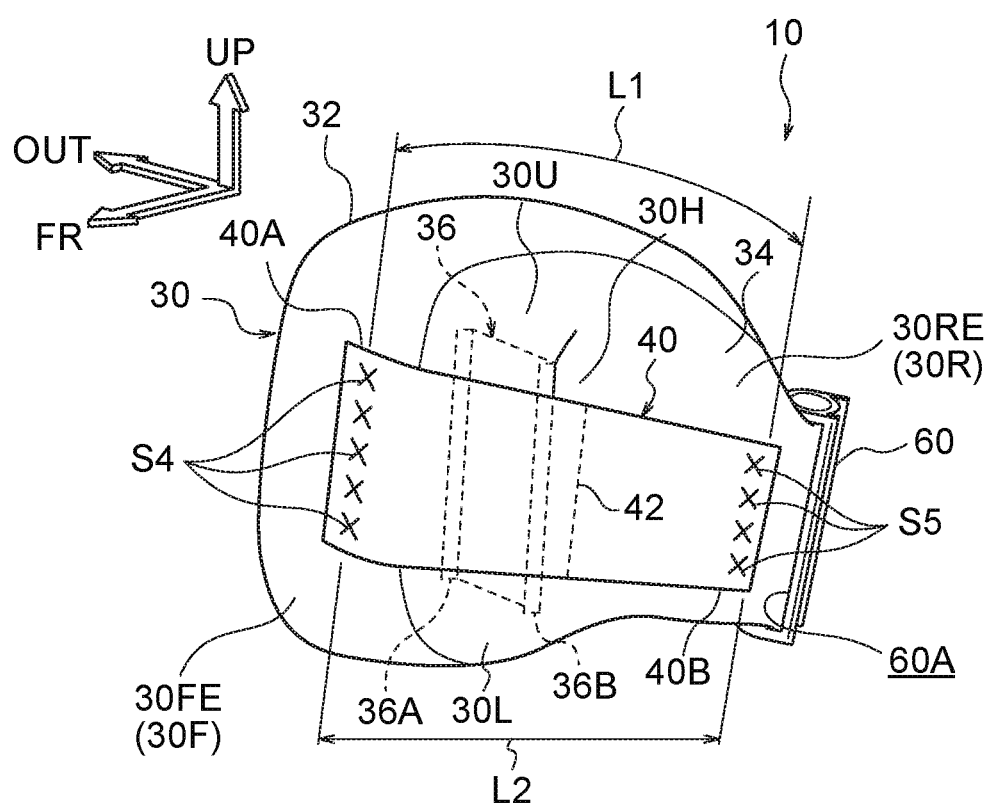
FIG. 3 is a perspective view showing the structure shown in FIG. 2, with illustration of a vehicle occupant omitted.
Figure 10:
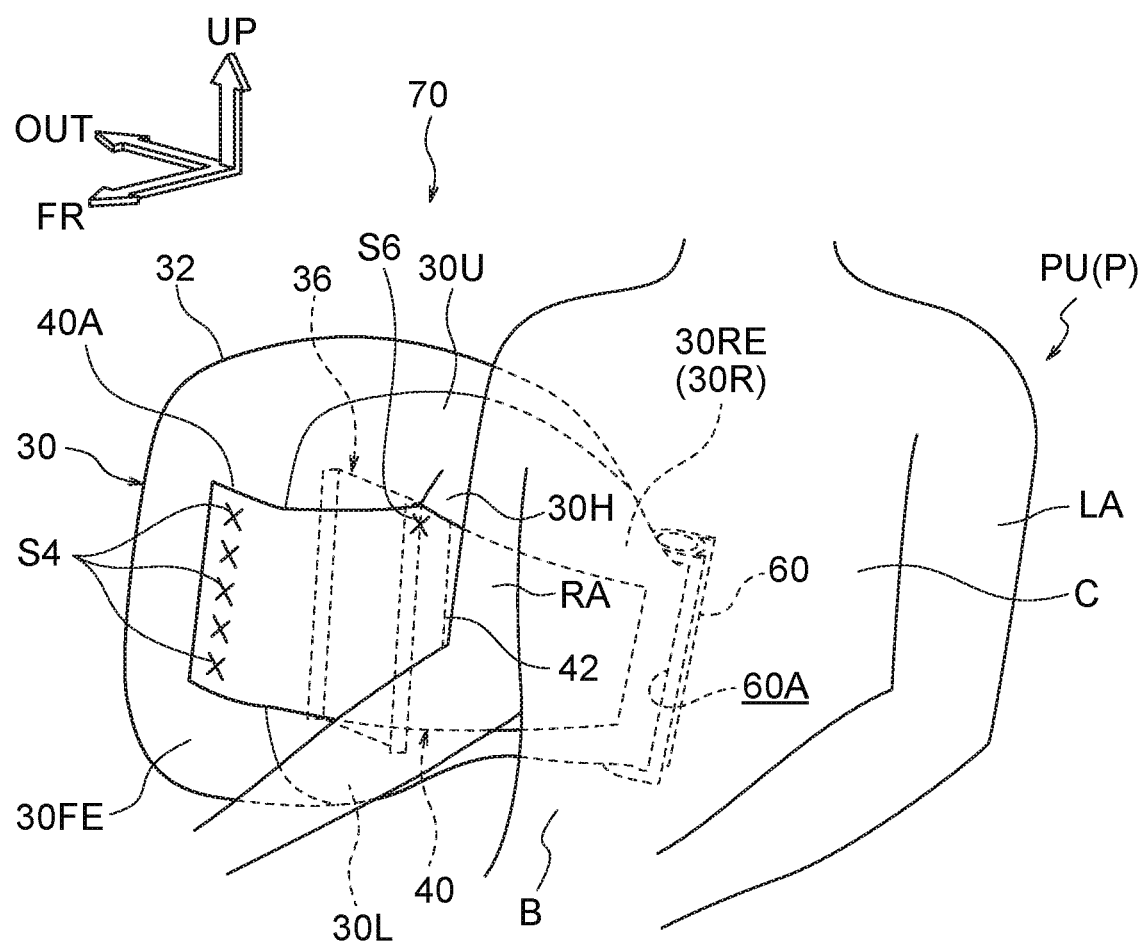
FIG. 10 is a perspective view that corresponds to FIG. 2 and shows an inflated and expanded state of the side airbag in a vehicle side airbag device relating to a second embodiment of the present disclosure.
Figure 11:
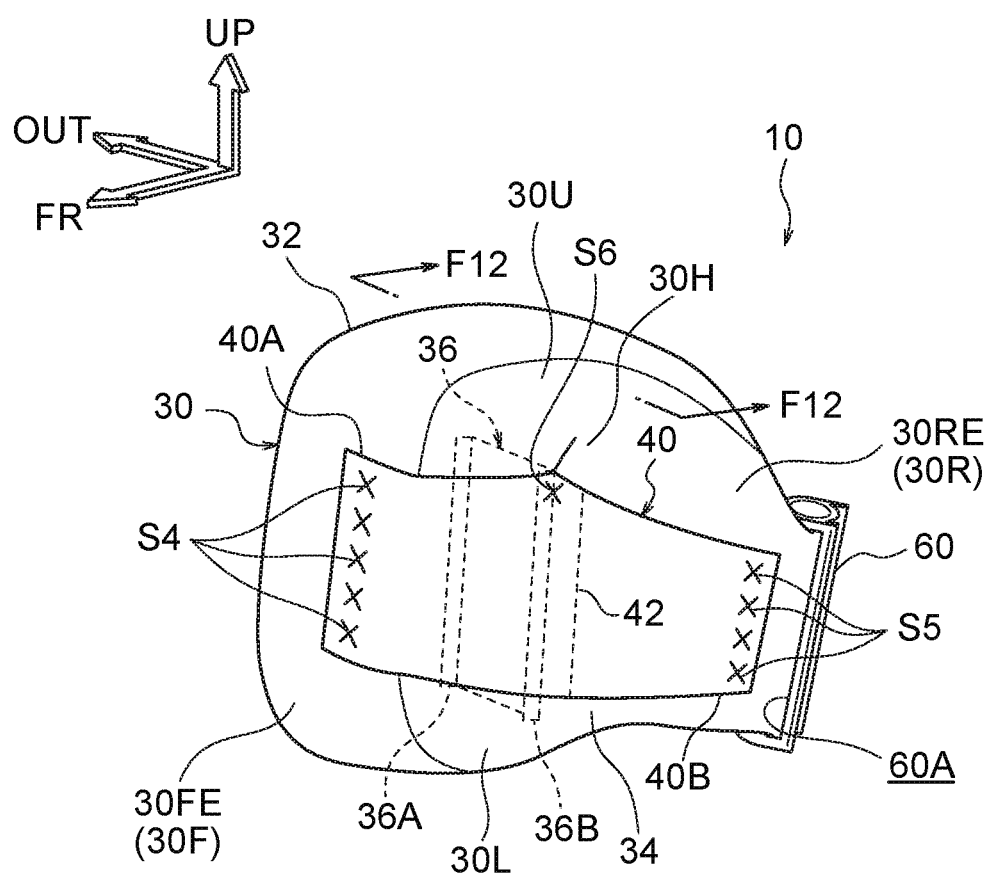
FIG. 11 is a perspective view that corresponds to FIG. 3 and shows the inflated and expanded state of the side airbag relating to the second embodiment.

An inflated and expanded state of the side airbag at a vehicle side airbag device 70 relating to a second embodiment of the present disclosure is shown in FIG. 10 in a perspective view that corresponds to FIG. 2. Further, the inflated and expanded state of the side airbag relating to the second embodiment is shown in FIG. 11 in a perspective view that corresponds to FIG. 3.

In this embodiment, the upper edge portion of the cloth body 40 is connected to the side airbag 30 in a vicinity of the bottom portion (a vicinity of the vehicle longitudinal direction central portion) of the indentation (the indentation 30H) that is formed at the vehicle transverse direction inner side surface of the side airbag 30 that is in an inflated and expanded state. Concretely, the length direction central portion of the upper edge portion of the cloth body 40, and a region of the inner side base cloth 34 which region is in a vicinity of the strap 36, are sewn (joined) together at sewn portion S6. Therefore, in the inflated and expanded state of the side airbag 30, the upper edge portion of the cloth body 40 is disposed far from the vehicle occupant P, and the lower edge portion of the cloth body 40 is disposed near to the vehicle occupant P. Due thereto, at the cloth body 40, the region (the length direction intermediate portion), which faces the upper right arm portion RA of the vehicle occupant P in the inflated and expanded state of the side airbag 30, is an inclined surface 40S (refer to FIG. 12A) that is inclined toward the vehicle transverse direction outer side while heading toward the vehicle upper side.

Figure 12A:
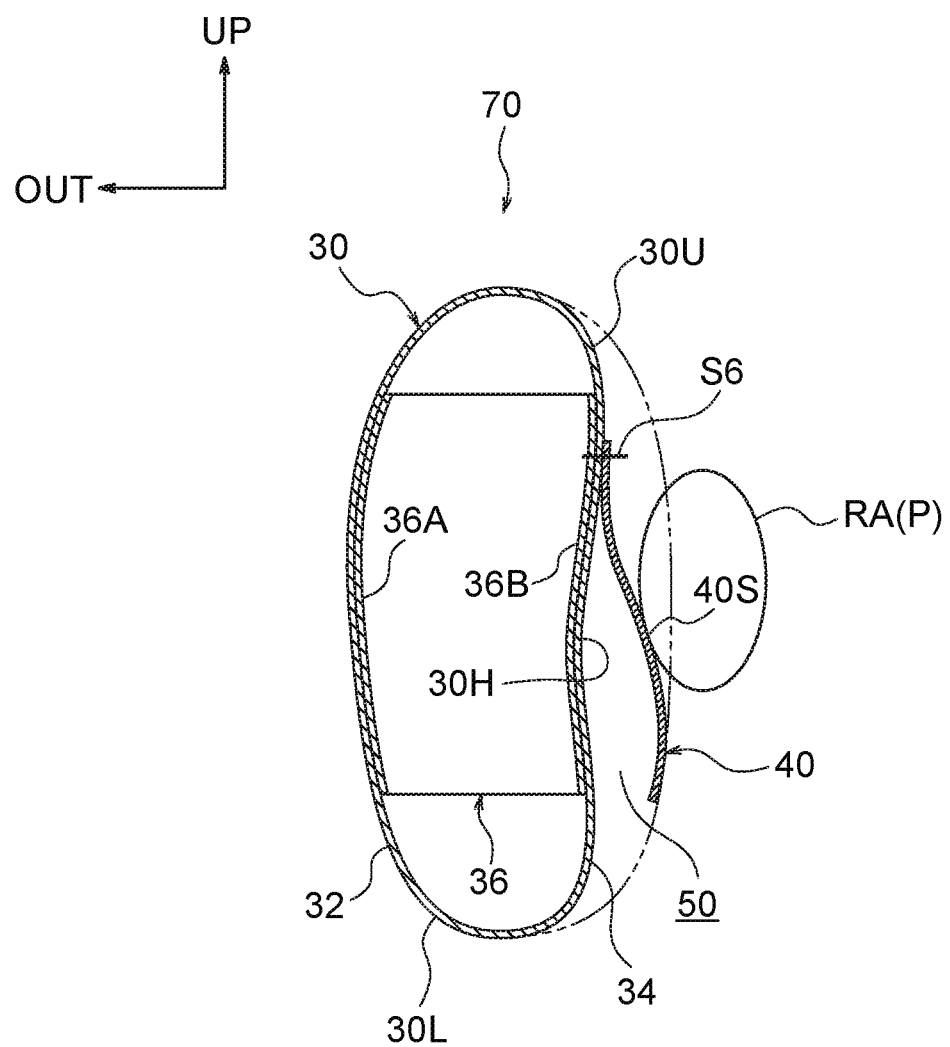
FIG. 12A is a vertical sectional view in which the inflated and expanded state of the side airbag relating to the second embodiment is seen from the vehicle front side, and is a drawing corresponding to the section cut along line F12-F12 of FIG. 11.
Figure 13A:
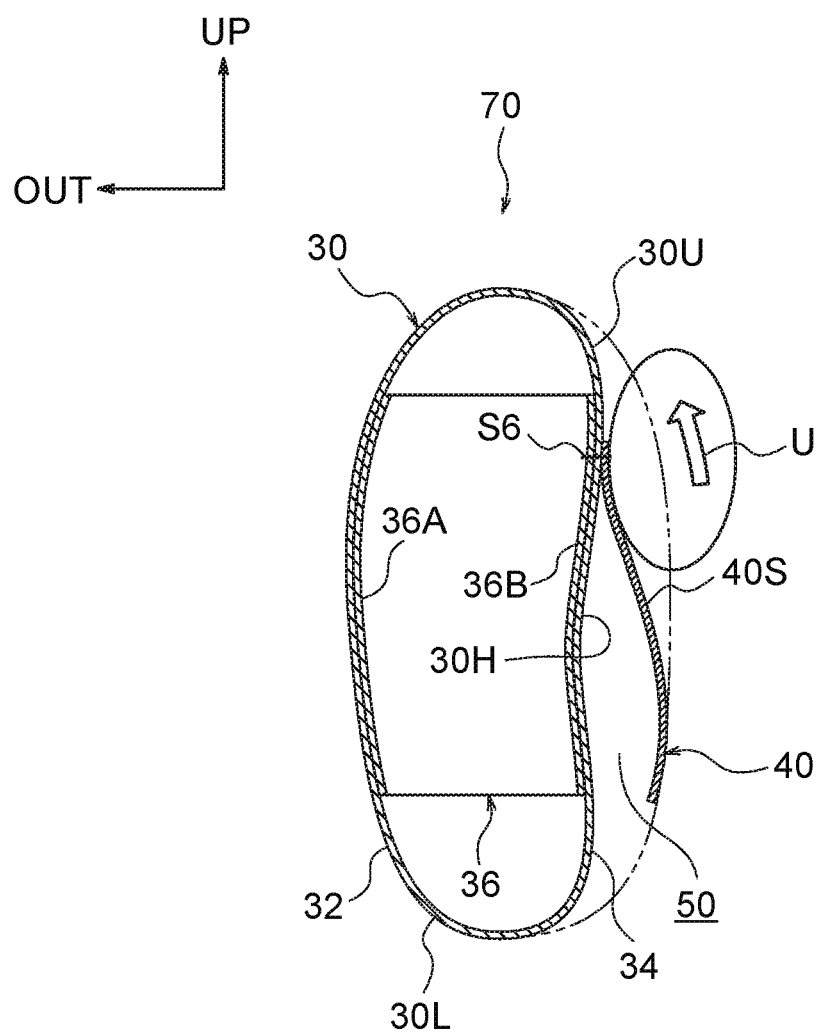
FIG. 13A is a vertical sectional view that corresponds to FIG. 12A and shows a state in which an upper arm portion of the vehicle occupant is pushed-up by sliding contact with the cloth body.
Figure 13B:
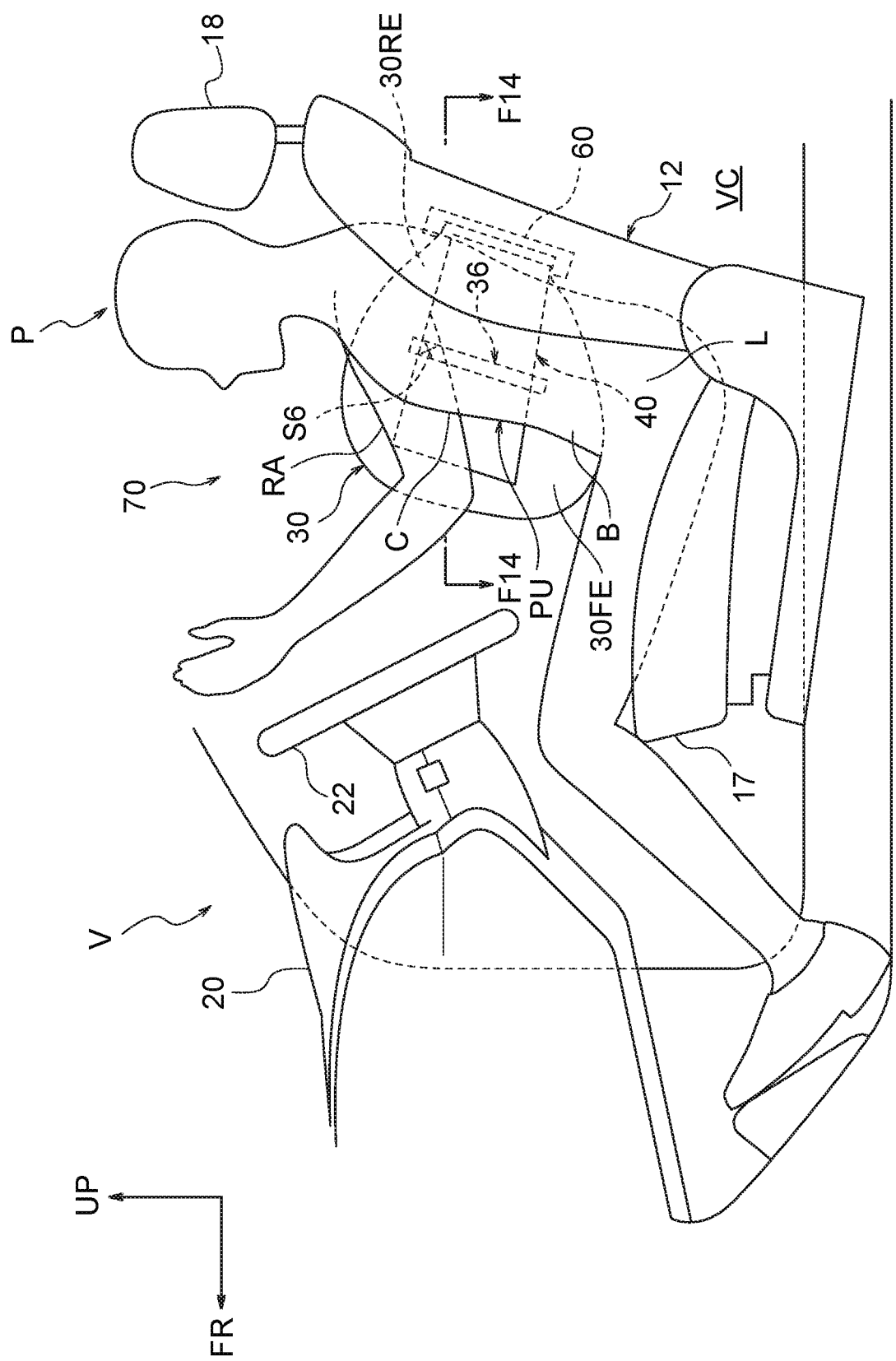
FIG. 13B is a side view that corresponds to FIG. 12B and shows the state in which the upper arm portion of the vehicle occupant is pushed-up by sliding contact with the cloth body.
Figure 14:
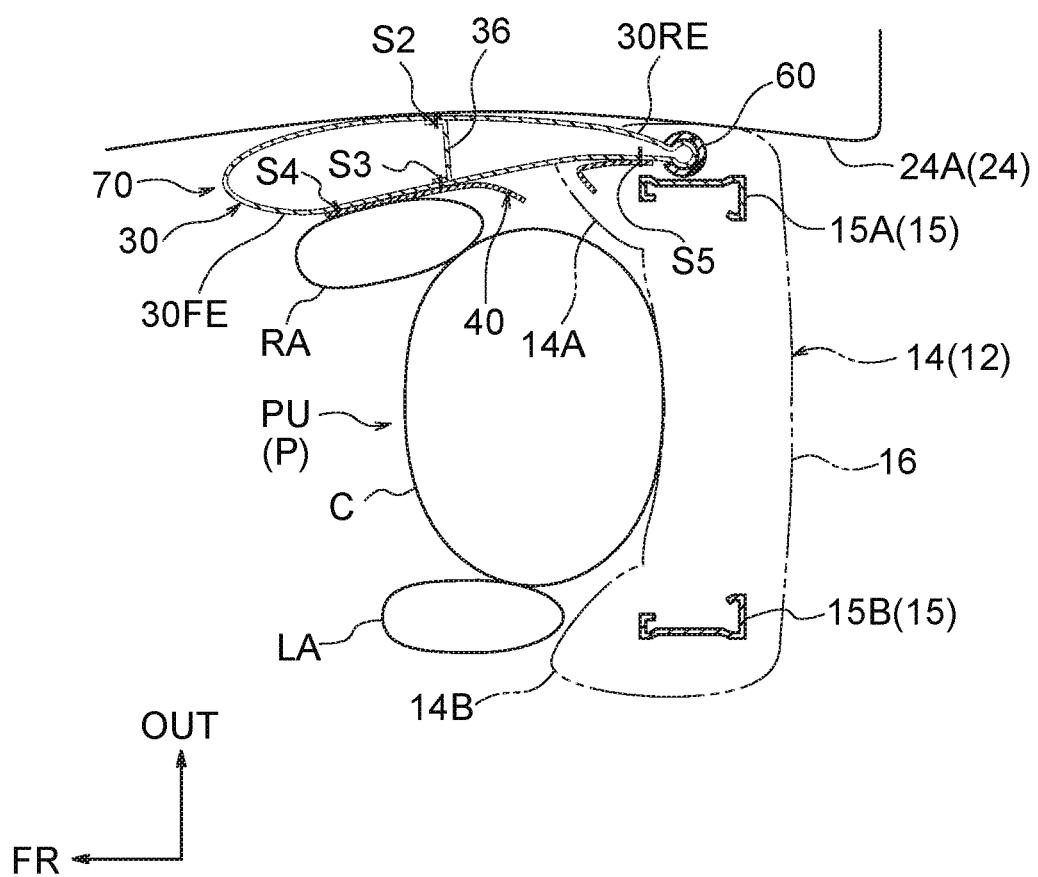
FIG. 14 is a plan sectional view showing the section cut along line F14-F14 of FIG. 13B.

In this embodiment, structures other than that described above are similar to those of the first embodiment. Accordingly, in this embodiment as well, operation and effects that are basically similar to those of the first embodiment are obtained. Moreover, in this embodiment, as shown in FIG. 12A and FIG. 12B, when the side airbag 30 inflates and expands, the region at the cloth body 40, which region faces the upper right arm portion RA of the vehicle occupant P, is the inclined surface 40S that is inclined toward the vehicle transverse direction outer side while heading toward the vehicle upper side. Therefore, when the upper right arm portion RA of the vehicle occupant P contacts the cloth body 40 in the first half of a side collision, as shown in FIG. 13A, FIG. 13B and FIG. 14, the upper right arm portion RA of the vehicle occupant P slides along the inclined surface 40S and is pushed away toward the vehicle upper side (refer to arrow U in FIG. 13A). As a result, it can be made such that the upper right arm portion RA is not sandwiched between the side airbag 30 and the chest portion C, and therefore, the load to the chest portion C (chest flexure) can be reduced as compared with a case in which the upper right arm portion RA is sandwiched-in.

Moreover, in the present embodiment, the cloth body 40 is a structure that is inclined as described above due to the upper edge portion of the cloth body 40 being connected to the side airbag 30 at the bottom surface of the indentation 30H that is formed at the vehicle transverse direction inner side surface of the side airbag 30. Therefore, the effect of pushing away the upper right arm portion RA toward the vehicle upper side can be obtained by a simple structure.

Third Embodiment

Figure 15:
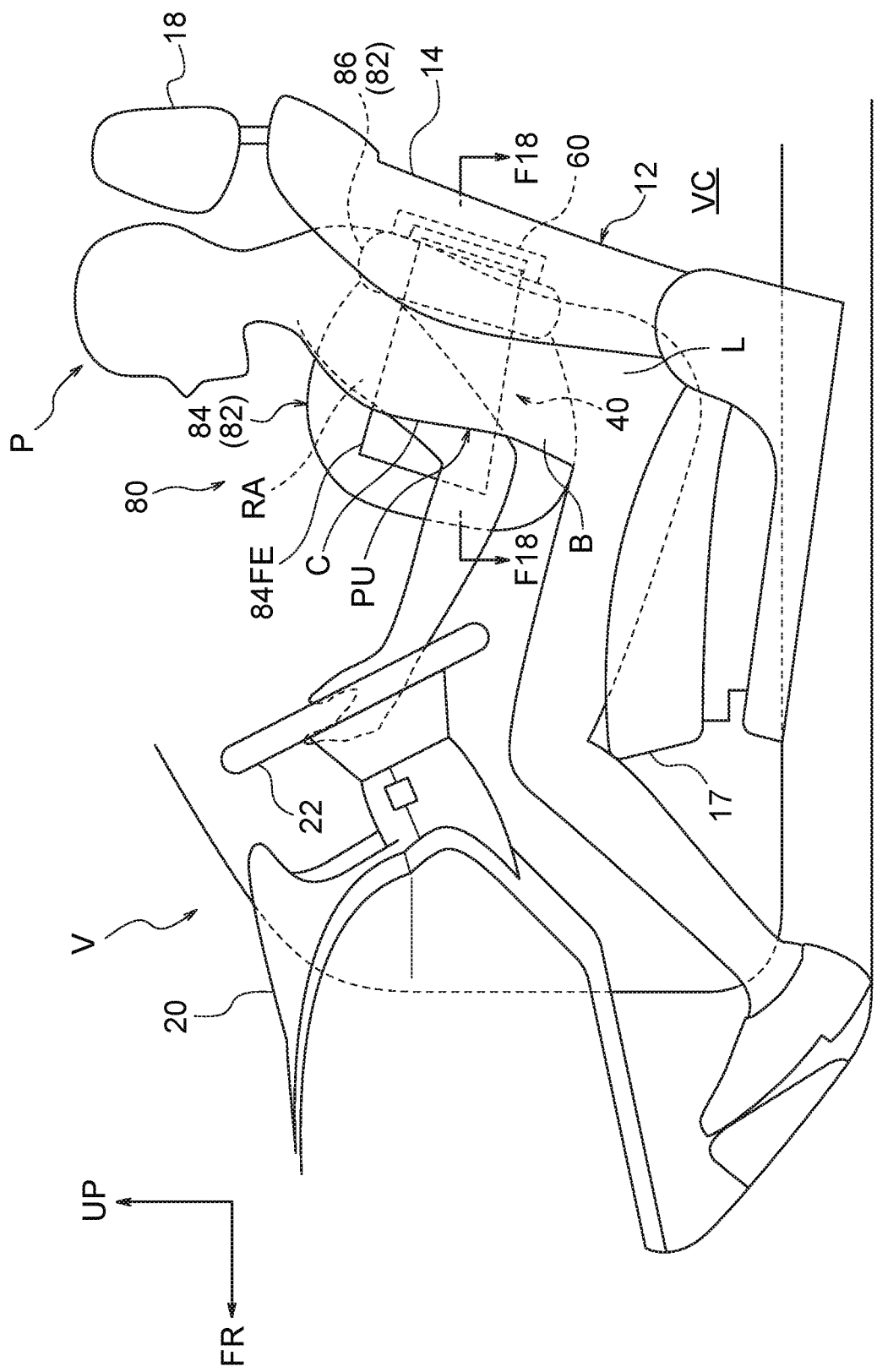
FIG. 15 is a side view that corresponds to FIG. 1 and shows an inflated and expanded state of a side airbag in a vehicle side airbag device relating to a third embodiment of the present disclosure.
Figure 16:
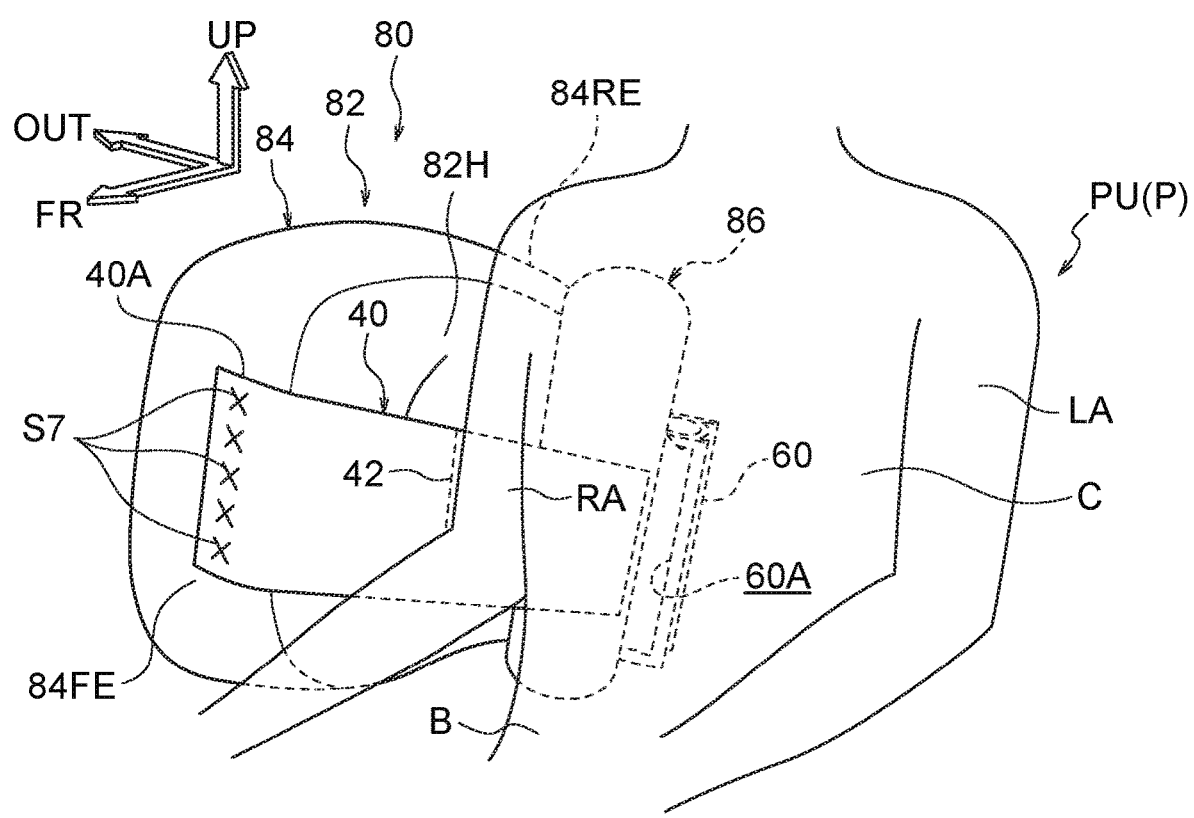
FIG. 16 is a perspective view that corresponds to FIG. 2 and shows the inflated and expanded state of the side airbag relating to the third embodiment.
Figure 17:
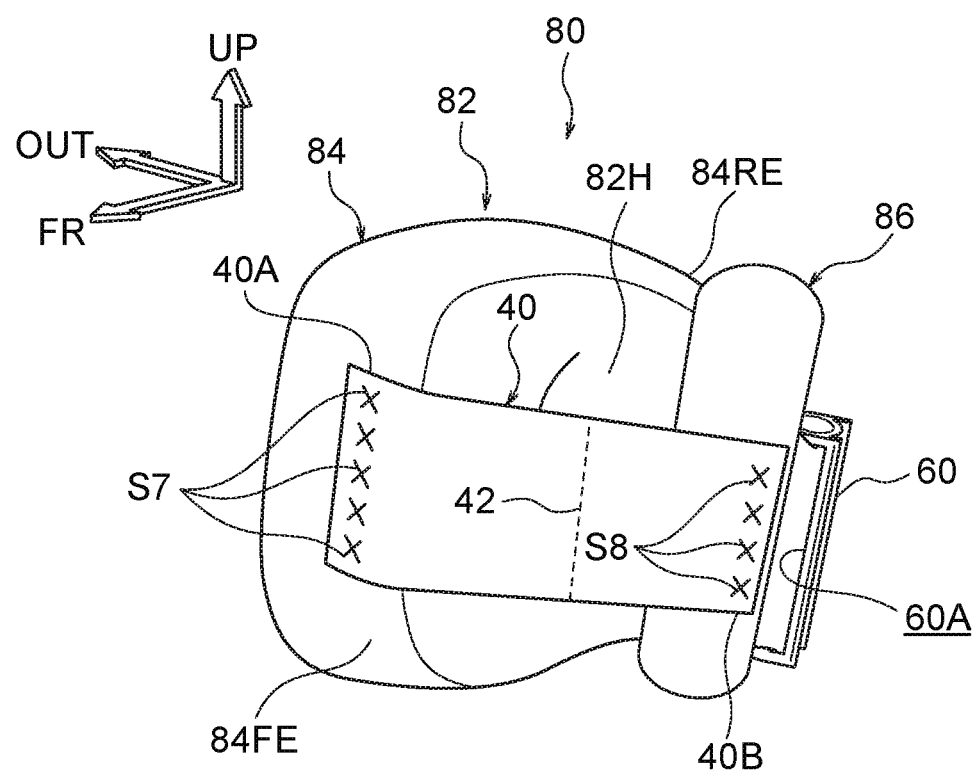
FIG. 17 is a perspective view that corresponds to FIG. 3 and shows the inflated and expanded state of the side airbag relating to the third embodiment.

An inflated and expanded state of a side airbag 82 at a vehicle side airbag device 80 relating to a third embodiment of the present disclosure is shown in FIG. 15 in a side view that corresponds to FIG. 1. Further, the inflated and expanded state of the side airbag relating to the third embodiment is shown in FIG. 16 and FIG. 17 in perspective views that correspond to FIG. 2 and FIG. 3.

In this embodiment, the side airbag 82 has a main air chamber 84 that inflates and expands toward the region between the upper body PU of the vehicle occupant P and the door trim 24A, and a rear end inner air chamber 86 that inflates and expands toward the region between a rear end portion 84RE of the main air chamber 84 and the upper body PU of the vehicle occupant P. The main air chamber 84 is structured similarly to the side airbag 30 relating to the first embodiment.

The rear end inner air chamber 86 is formed in the shape of an elongated bag due to, for example, cloth materials that are cut-out in substantially elliptical shapes being superposed together and the outer peripheral edge portions thereof being sewn together. This rear end inner air chamber 86 is joined to the rear end portion 84RE of the main air chamber 84 by a means such as sewing or the like. The interior of the main air chamber 84 and the interior of the rear end inner air chamber 86 communicate with one another. Gas from an inflator, which is not shown and is disposed in a vicinity of the joined portion of the main air chamber 84 and the rear end inner air chamber 86, is distributed into the main air chamber 84 and into the rear end inner air chamber 86. The main air chamber 84 and the rear end inner air chamber 86 thereby inflate and expand. The rear end inner air chamber 86 inflates and expands in the shape of a solid cylinder whose axial direction is the vertical direction of the seatback 14, and is interposed between, on the one hand, the rear portions of the chest portion C and the abdominal region B of the vehicle occupant P, and, on the other hand, the rear end portion 84RE of the main air chamber 84 that has inflated and expanded.

At the side airbag 82 that has the above-described structure, the vehicle transverse direction inner side surface that faces in the vehicle occupant P in the inflated and expanded state is sunken in toward the vehicle transverse direction outer side as seen in a plan view. Namely, an indentation (concave portion) 82H that is sunken in toward the vehicle transverse direction outer side is formed at the vehicle transverse direction inner side surface of the side airbag 82 that is in the inflated and expanded state.

Further, in the present embodiment, the cloth body 40 spans between a front end portion 84FE of the main air chamber 84 that structures the front end portion of the side airbag 82, and the rear end inner air chamber 86 that structures the rear end portion of the side airbag 82. Concretely, the length direction one end portion 40A of the cloth body 40 and the front end portion 84FE of the main air chamber 84 are sewn (joined) together at sewn portion S7. Further, the length direction other end portion 40B of the cloth body 40, and the surface of the rear end inner air chamber 86 which surface is at the side opposite the main air chamber 84 (the surface that faces the vehicle transverse direction inner side in the inflated and expanded state), are sewn (joined) together at sewn portion S8.

Figure 18A:
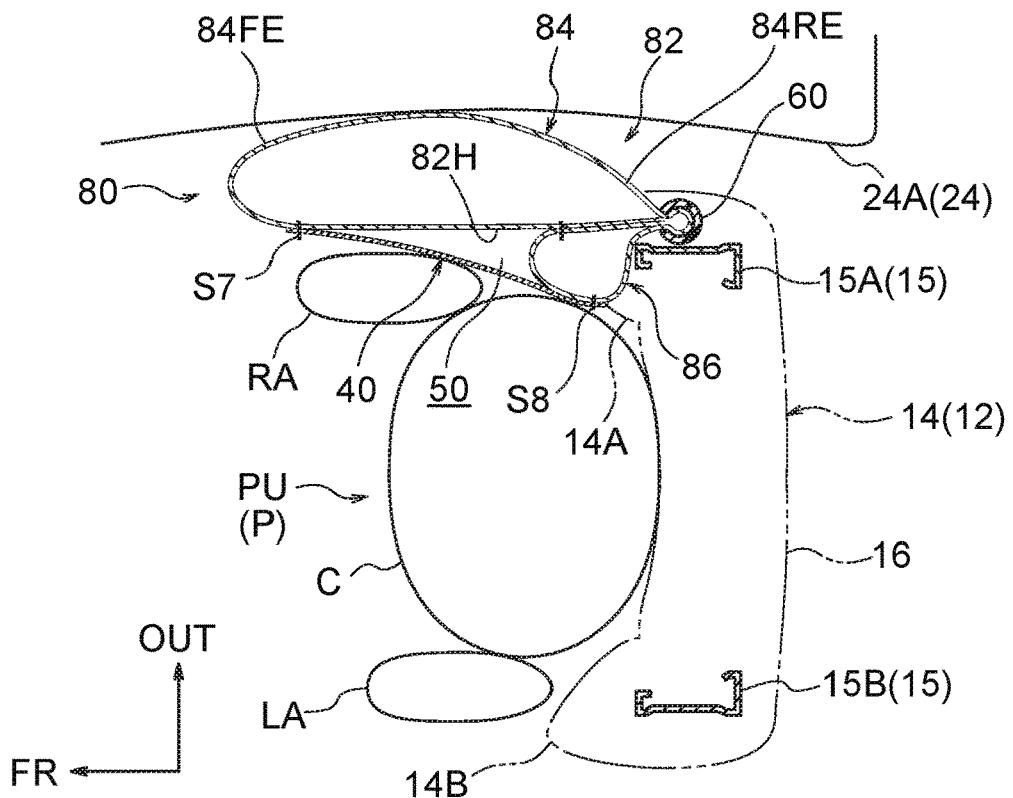
FIG. 18A is an enlarged plan sectional view in which the section cut along line F18-F18 of FIG. 15 is enlarged.

Due thereto, the cloth body 40 spans between the front end portion 84FE of the main air chamber 84 and the rear end inner air chamber 86, i.e., between the front and rear both end portions of the side airbag 82. This cloth body 40 is disposed at the vehicle occupant P side with respect to the side airbag 82 that has inflated and expanded, and is stretched between the front and rear both end portions of the side airbag 82 (refer to FIG. 15 through FIG. 18A). As shown in FIG. 18A, the cloth body 40 that is stretched is inclined toward the vehicle transverse direction outer side while heading toward the vehicle front side, and the gap 50 is formed between the cloth body 40 and the side airbag 82.

In this embodiment, structures other than that described above are similar to those of the first embodiment. Accordingly, in this embodiment as well, operation and effects that are basically similar to those of the first embodiment are obtained. Moreover, in this embodiment, as shown in FIG.

Figure 18B:
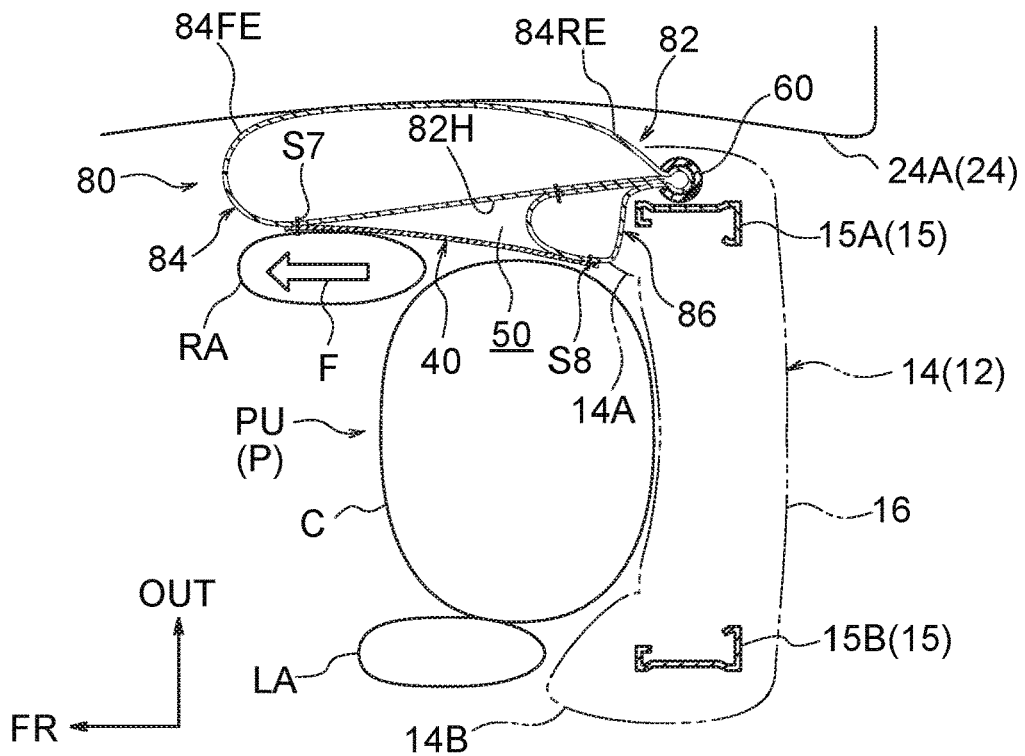
FIG. 18B is a plan sectional view that corresponds to FIG. 18A and shows a vehicle occupant restraining state, in the first half of a side collision, by the side airbag and the cloth body relating to the third embodiment.

15 through FIG. 18A, when the side airbag 30 inflates and expands, the cloth body 40 is inclined toward the vehicle transverse direction outer side while heading toward the vehicle front side. Therefore, when the upper right arm portion RA of the vehicle occupant P contacts the cloth body 40 in the first half of a side collision, as shown in FIG. 18B, the upper right arm portion RA of the vehicle occupant P slides along the surface of the cloth body 40 and is pushed away toward the vehicle front side (refer to arrow F in FIG. 18B). As a result, it can be made such that the upper right arm portion RA is not sandwiched between the side airbag 30 and the chest portion C, and therefore, the load to the chest portion C (chest flexure) can be reduced as compared with a case in which the upper right arm portion R is sandwiched-in.

Figure 18C:
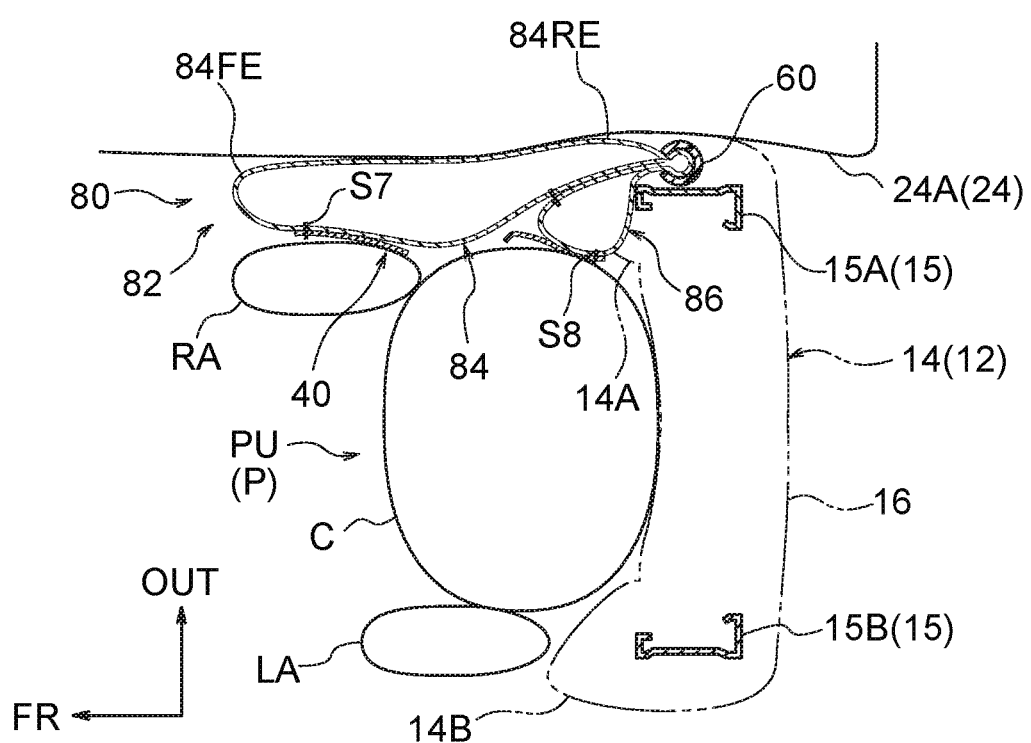
FIG. 18C is a plan sectional view that corresponds to FIG. 18A and FIG. 18B and shows a vehicle occupant restraining state, in the second half of a side collision, by the side airbag and the cloth body relating to the third embodiment.

Note that, in the second half of a side collision, the side airbag 82 moves together with the side door 24 toward the vehicle occupant P side (the vehicle transverse direction inner side), and load from the upper right arm portion RA and the torso (the chest portion C and the like) is applied to the cloth body 40. Due thereto, as shown in FIG. 18C, the cloth body 40 breaks at the perforation 42, and the upper body PU of the vehicle occupant P is restrained (held) at a high load by the side airbag 82.

Further, in this embodiment, the cloth body 40 is inclined as described above by the simple structure of merely adding the rear end inner air chamber 86 to the rear end portion 84RE of the side airbag 82. Therefore, the effect of pushing away the upper right arm portion RA toward the vehicle front side can be obtained by a simple structure. Further, in this embodiment, the rear portions, where the load resistance is relatively high, of the chest portion C and the abdominal region B of the vehicle occupant P can be restrained at an early stage by the rear end inner air chamber 86 that inflates and expands further toward the vehicle occupant P side than the main air chamber 84.

Fourth Embodiment

Figure 19A:
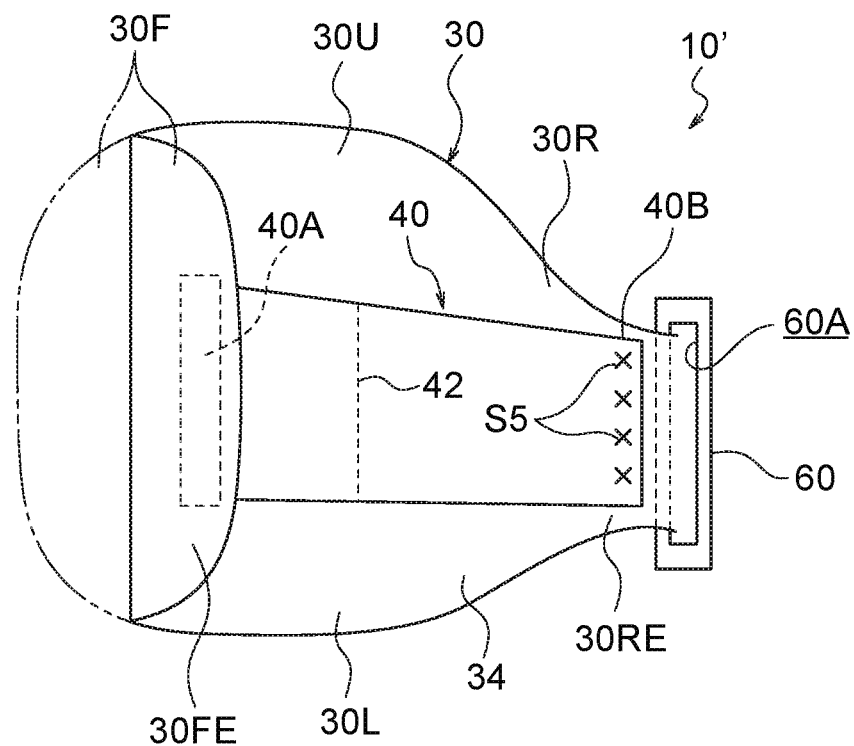
FIG. 19A is a side view showing a first folding step of the side airbag in a method of manufacturing a vehicle side airbag device relating to a fourth embodiment of the present disclosure.
Figure 19B:
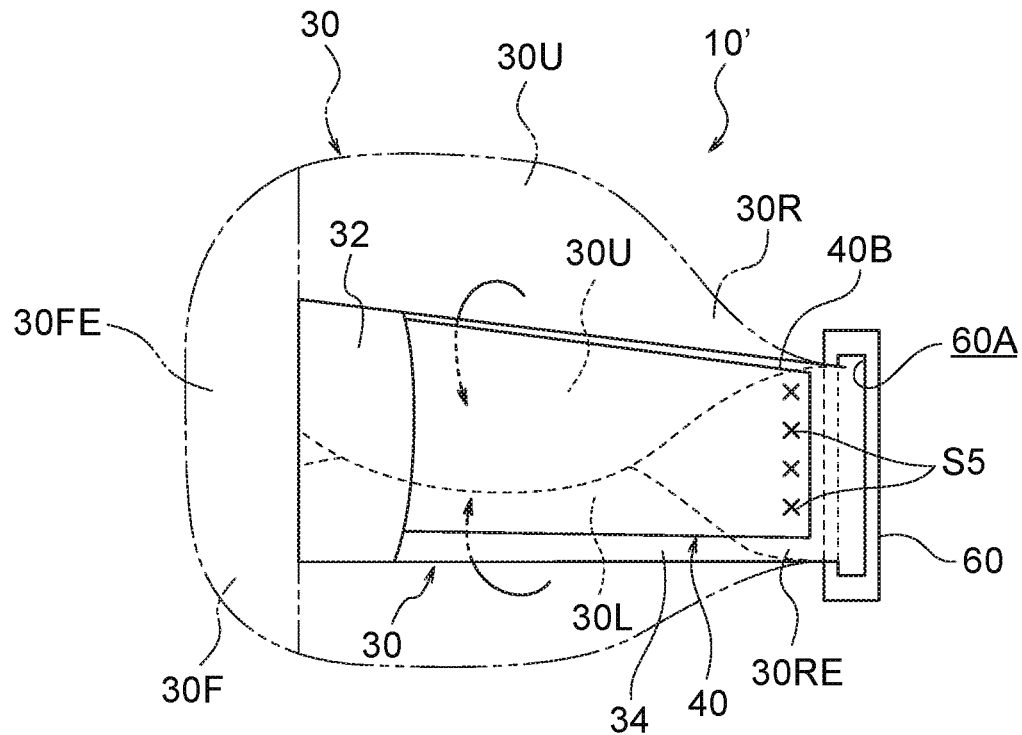
FIG. 19B is a side view showing a second folding step of the side airbag in the manufacturing method.
Figure 19C:
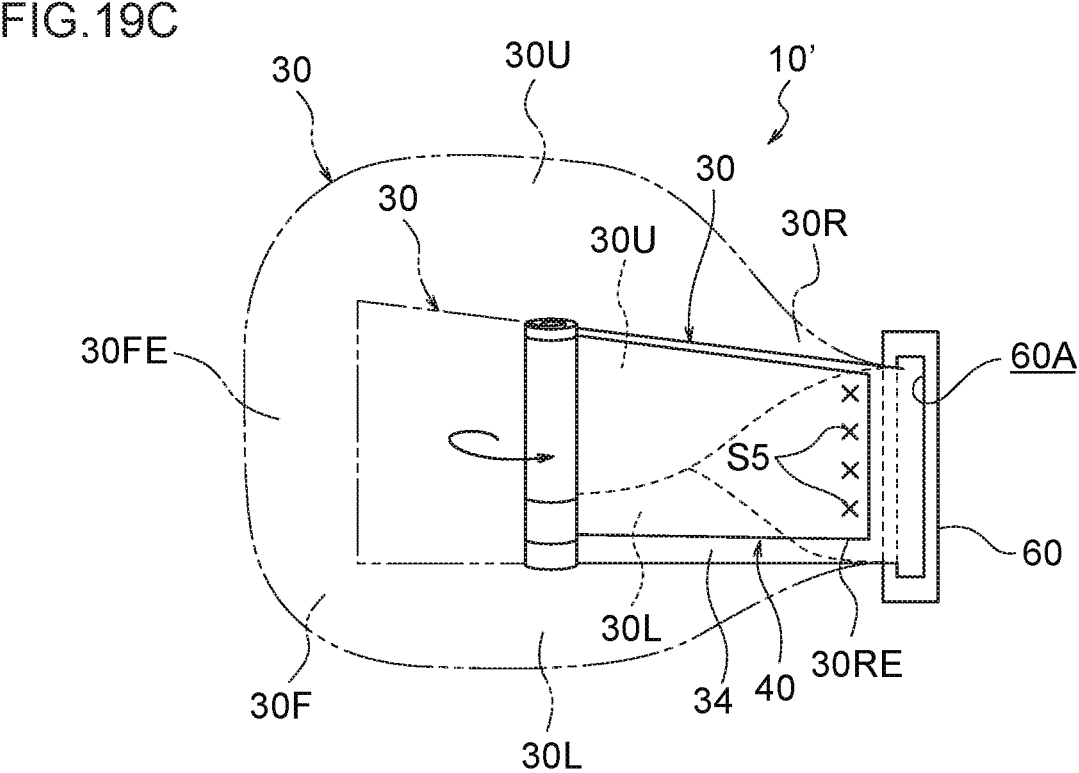
FIG. 19C is a side view showing a third folding step of the side airbag in the manufacturing method.
Figure 19D:
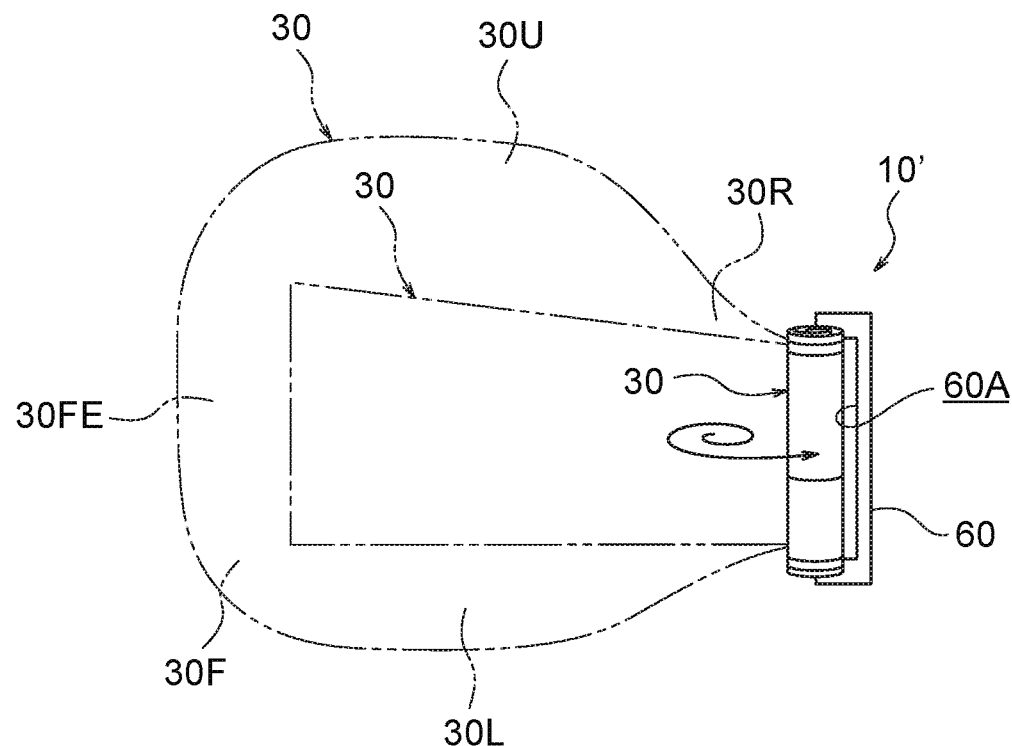
FIG. 19D is a side view showing the side airbag after the third folding step of the manufacturing method.

First through third folding steps in a method of manufacturing a vehicle side airbag device 10' relating to a fourth embodiment of the present disclosure are shown in side views in FIG. 19A through FIG. 19C. The side airbag after the third folding step is shown in a side view in FIG. 19D. The vehicle side airbag device 10' relating to the fourth embodiment is structured basically similarly to the vehicle side airbag device 10 relating to the first embodiment, but the way of folding the side airbag 30 differs from that of the vehicle side airbag device 10 relating to the first embodiment.

Concretely, in the method of manufacturing the vehicle side airbag device 10' relating to the fourth embodiment, a first folding step that is shown in FIG. 19A and a third folding step that is shown in FIG. 19C are similar to the first folding step and the third folding step relating to the first embodiment. On the other hand, in the second folding step relating to the fourth embodiment, as shown in FIG. 19B, the upper portion 30U of the side airbag 30 is folded over toward the lower end side of the side airbag 30 and the side opposite the cloth body 40, and the lower portion 30L of the side airbag 30 is folded over toward the upper end side of the side airbag 30 and the side opposite the cloth body 40. In this case, the lower portion 30L of the side airbag 30 is superposed on the outer side of the upper portion 30U, and the side airbag 30 is folded in three parts vertically. In this embodiment, structures other than that described above are similar to the first embodiment.

In this embodiment, at the time of a side collision of the vehicle V, the side airbag 30 that is folded up as described above is inflated and expanded toward the vehicle front side while being unrolled, and thereafter, the upper portion 30U and the lower portion 30L are inflated and expanded toward the vehicle vertical direction both sides. At this time, the upper portion 30U and the lower portion 30L of the side airbag 30 inflate and expand toward the vehicle vertical direction both sides from the side (the vehicle transverse direction outer side) opposite the cloth body 40 that is disposed at the vehicle occupant P side (the vehicle transverse direction inner side) with respect to the side airbag 30. Due thereto, from the initial stage of the inflation and expansion of the side airbag 30, the cloth body 40 faces the upper body PU of the vehicle occupant P so as to be able to contact the upper body PU. Therefore, even if, for some reason, the cloth body 40 and the side airbag 30 approach the upper body PU earlier than planned, the cloth body 40 can be made to contact the upper body PU. As a result, the side airbag 30 that is in the initial stage of inflation and expansion contacting the upper body PU inadvertently, and the load to the upper body PU increasing suddenly, can be prevented or suppressed. Further, in this embodiment as well, other than the above-described points, operation and effects that are basically similar to those of the first embodiment are obtained.

Supplemental Description of Embodiments

In the above-described respective embodiments, the perforation 42 (weak portion) is formed at the length direction central portion of the cloth body 40. However, the present disclosure is not limited to this, and may be structured such that the perforation 42 is formed at the length direction one end portion 40A side or the length direction other end portion 40B side of the cloth body 40. Further, the weak portion that is provided at the cloth body 40 is not limited to the stitch-like perforation 42, and it suffices for the weak portion to break due to load that is applied from the upper right arm portion RA and the torso (the chest portion C and the like) of the vehicle occupant P. Further, there may be a structure in which a weak portion is not provided at the cloth body 40.

Further, in the above-described second and third embodiments, the region of the cloth body 40, which region faces at least the upper right arm portion RA of the vehicle occupant P, is inclined toward the vehicle transverse direction outer side while heading toward the vehicle upper side or the vehicle front side. Due thereto, the upper right arm portion RA is pushed away toward the vehicle upper side or the vehicle front side. However, the present disclosure is not limited to this. For example, there may be a structure in which the upper right arm portion RA is pushed away toward the vehicle upper side or the vehicle front side by adjusting the mounted position or the mounting angle of the cloth body 40 with respect to the side airbag 30.

Further, in the above-described first, second and fourth embodiments, the single strap 36 that serves as a deformation restricting member is disposed at the vehicle longitudinal direction central portion of the interior of the side airbag 30 that is in the inflated and expanded state, so as to extend in the vehicle vertical direction. However, the present disclosure is not limited to this, and there may be a structure in which the inflated and expanded shape of the side airbag 30 is restricted by plural deformation restricting members (straps, tethers or the like) that are disposed within the side airbag 30.

In addition, the present disclosure can be implemented by being modified in various ways within a scope that does not depart from the gist thereof. Further, the scope of the right of the present disclosure is, of course, not limited to the above-described respective embodiments.

What is claimed is:

1. A vehicle side airbag device comprising:
a side airbag that is accommodated in a folded-up state within a side portion, which is at a vehicle transverse direction outer side at a seatback of a vehicle seat, and, at a time of a side collision of a vehicle, the side airbag inflating and expanding between an upper body of a vehicle occupant and a vehicle side portion, and a vehicle transverse direction inner side surface of the side airbag, which faces the vehicle occupant, is curved toward a vehicle transverse direction outer side as seen in plan view, and that the side airbag includes an outer side base cloth in the vehicle transverse direction outer side and an inner side base cloth in a vehicle transverse direction inner side; and
a cloth body that is disposed at a vehicle occupant side with respect to the side airbag when it is inflated and expanded, and that spans between front and rear both end portions of the side airbag and is stretched between the front and rear both end portions, a gap being formed between the side airbag and the cloth body, wherein
a width of the cloth body along a vertical direction of the side airbag is configured to be shorter than a vertical width of the inner side base cloth and the outer side base cloth, in an inflated and expanded state of the side airbag, is disposed at the same height as a chest portion of the vehicle occupant, and faces an upper arm portion of the vehicle occupant so as to contact or be adjacent to the upper arm portion from the vehicle transverse direction outer side,
in an inflated and expanded state of the side airbag, a region of the cloth body, which region faces at least an upper arm portion of the vehicle occupant, is inclined toward the vehicle transverse direction outer side while heading toward a vehicle upper side, and
an upper edge portion of the cloth body is connected to the side airbag at a bottom surface of an indentation that is formed at the vehicle transverse direction inner side surface of the side airbag, which is in an inflated and expanded state.

2. The vehicle side airbag device of claim 1, wherein the cloth body includes a weak portion that is set so as to break due to a load applied from an upper arm portion and a torso of the vehicle occupant, and that is severed into front and rear portions by breaking.

3. The vehicle side airbag device of claim 1, wherein:
a deformation restricting member, which is disposed so as to extend in a vehicle vertical direction and connects base cloths of the side airbag that face one another in a vehicle transverse direction, is provided at a vehicle longitudinal direction central portion of an interior of the side airbag that is in an inflated and expanded state;
the cloth body spans between a front end joined portion that is set at a front end portion of the base cloths of the side airbag, and a rear end joined portion that is set at a rear end portion of the base cloths; and
a length of the cloth body is set to be shorter than a length from the front end joined portion to the rear end joined portion at the base cloths.

4. The vehicle side airbag device of claim 1, wherein:
the side airbag includes a main air chamber that inflates and expands toward a region between the upper body of the vehicle occupant and the vehicle side portion, and a rear end inner air chamber that inflates and expands toward a region between a rear end portion of the main air chamber and the upper body of the vehicle occupant; and
the cloth body spans between a front end portion of the main air chamber and the rear end inner air chamber.

5. A vehicle side airbag device comprising:
a side airbag that is accommodated in a folded-up state within a side portion, which is at a vehicle transverse direction outer side at a seatback of a vehicle seat, and, at a time of a side collision of a vehicle, the side airbag inflating and expanding between an upper body of a vehicle occupant and a vehicle side portion, and a vehicle transverse direction inner side surface of the side airbag, which faces the vehicle occupant, is curved toward a vehicle transverse direction outer side as seen in plan view, and that the side airbag includes an outer side base cloth in the vehicle transverse direction outer side and an inner side base cloth in a vehicle transverse direction inner side; and
a cloth body that is disposed at a vehicle occupant side with respect to the side airbag when it is inflated and expanded, and that spans between front and rear both end portions of the side airbag and is stretched between the front and rear both end portions, a gap being formed between the side airbag and the cloth body, wherein
a width of the cloth body along a vertical direction of the side airbag is configured to be shorter than a vertical width of the inner side base cloth and the outer side base cloth, in an inflated and expanded state of the side airbag, is disposed at the same height as a chest portion of the vehicle occupant, and faces an upper arm portion of the vehicle occupant so as to contact or be adjacent to the upper arm portion from the vehicle transverse direction outer side, and
in an inflated and expanded state of the side airbag, a region of the cloth body, which region faces at least an upper arm portion of the vehicle occupant, is inclined toward the vehicle transverse direction outer side while heading toward a vehicle front side.

6. The vehicle side airbag device of claim 5, wherein an upper edge portion of the cloth body is connected to the side airbag at a bottom surface of an indentation that is formed at the vehicle transverse direction inner side surface of the side airbag, which is in an inflated and expanded state.

7. A vehicle side airbag device comprising:
a side airbag that is accommodated in a folded-up state within a side portion, which is at a vehicle transverse direction outer side at a seatback of a vehicle seat, and, at a time of a side collision of a vehicle, the side airbag inflating and expanding between an upper body of a vehicle occupant and a vehicle side portion, and a vehicle transverse direction inner side surface of the side airbag, which faces the vehicle occupant, is curved toward a vehicle transverse direction outer side as seen in plan view, and that the side airbag includes an outer side base cloth in the vehicle transverse direction outer side and an inner side base cloth in a vehicle transverse direction inner side; and
a cloth body that is disposed at a vehicle occupant side with respect to the side airbag when it is inflated and expanded, and that spans between front and rear both end portions of the side airbag and is stretched between the front and rear both end portions, a gap being formed between the side airbag and the cloth body, wherein a width of the cloth body along a vertical direction of the side airbag is configured to be shorter than a vertical width of the inner side base cloth and the outer side base cloth, in an inflated and expanded state of the side airbag, is disposed at the same height as a chest portion of the vehicle occupant, and faces an upper arm portion of the vehicle occupant so as to contact or be adjacent to the upper arm portion from the vehicle transverse direction outer side, and the cloth body is attached to a vertical direction central portion of the side airbag with a length direction of the cloth body being a longitudinal direction of the side airbag.

8. The vehicle side airbag device of claim 1, wherein a width of a front end portion of the cloth body along the vertical direction of the side airbag is configured to be longer than a rear end portion of the cloth body along the vertical direction of the side airbag.

9. The vehicle side airbag device of claim 4, wherein the rear end inner air chamber inflates and expands in a shape of a solid cylinder whose axial direction is the vertical direction of the seatback, and is interposed between, on one hand, a rear portion of a chest portion and an abdominal region of the vehicle occupant, and, on another hand, a rear end portion of the main air chamber that has inflated and expanded.

10. The vehicle side airbag device of claim 5, wherein:
the side airbag includes a main air chamber that inflates and expands toward a region between the upper body of the vehicle occupant and the vehicle side portion, and a rear end inner air chamber that inflates and expands toward a region between a rear end portion of the main air chamber and the upper body of the vehicle occupant; and the cloth body spans between a front end portion of the main air chamber and the rear end inner air chamber.

11. The vehicle side airbag device of claim 10, wherein the rear end inner air chamber inflates and expands in a shape of a solid cylinder whose axial direction is the vertical direction of the seatback, and is interposed between, on one hand, a rear portion of a chest portion and an abdominal region of the vehicle occupant, and, on another hand, a rear end portion of the main air chamber that has inflated and expanded.

12. The vehicle side airbag device of claim 5, wherein an upper edge portion of the cloth body is connected to the side airbag at a bottom surface of an indentation that is formed at the vehicle transverse direction inner side surface of the side airbag, which is in an inflated and expanded state.

* * * * *